(12) United States Patent
Blauvelt et al.

(10) Patent No.: US 7,031,575 B2
(45) Date of Patent: Apr. 18, 2006

(54) OPTICAL COMPONENT FOR FREE-SPACE OPTICAL PROPAGATION BETWEEN WAVEGUIDES

(75) Inventors: Henry A. Blauvelt, San Marino, CA (US); Joel S. Paslaski, Alhambra, CA (US); David W. Vernooy, Sierra Madre, CA (US)

(73) Assignee: Xponent Photonics Inc, Monrovia, CA (US)

( * ) Notice: Subject to any disclaimer, the term of this patent is extended or adjusted under 35 U.S.C. 154(b) by 210 days.

(21) Appl. No.: 10/682,768

(22) Filed: Oct. 9, 2003

(65) Prior Publication Data

US 2005/0078913 A1    Apr. 14, 2005

Related U.S. Application Data

(60) Provisional application No. 60/425,370, filed on Nov. 12, 2002, provisional application No. 60/466,799, filed on Apr. 29, 2003.

(51) Int. Cl.
G02B 6/26    (2006.01)

(52) U.S. Cl. .............................. 385/39; 385/31; 385/33

(58) Field of Classification Search .................. 385/39, 385/50

See application file for complete search history.

(56) References Cited

U.S. PATENT DOCUMENTS

| 4,707,064 A | 11/1987 | Dobrowolski et al. |
| 4,750,799 A | 6/1988 | Kawachi et al. |
| 4,969,712 A | 11/1990 | Westwood et al. |
| 5,682,446 A | 10/1997 | Pan et al. |
| 6,157,760 A | 12/2000 | Fujita et al. |
| 6,324,314 B1 | 11/2001 | Ukechi et al. |
| 2002/0031307 A1 | 3/2002 | Kimura |
| 2003/0021550 A1* | 1/2003 | Korenaga et al. ............. 385/88 |
| 2003/0235371 A1 | 12/2003 | Shimada et al. |

OTHER PUBLICATIONS

Hashimoto et al, A 1.3/1.55-um Wavelength-Division Multiplexing Optical Module Using a Planar Lightwave Circuit for Full Duplex Operation, Journal of Lightwave Technology, Nov. 2000, Page(s) 1541-1547, vol. 18, No. 11.

(Continued)

Primary Examiner—Sung Pak
(74) Attorney, Agent, or Firm—David S. Alvai; Scott R. Miller; Christie Parker & Hale LLP

(57) ABSTRACT

An optical component may comprise a horizontal member with two side walls and a substantially transparent end wall protruding from the horizontal member. The end wall, side walls and horizontal member may partially enclose an interior volume, and optical functionality is imparted in any suitable manner on at least a portion of the end wall. An optical assembly may comprise such an optical component mounted on a waveguide substrate along with a planar waveguide and a second waveguide, which are end-coupled by either reflection from the optical component end wall or transmission through the optical component end wall. An end portion of a planar waveguide may be received within the interior volume of the mounted component. Proper positioning of the optical component relative to the waveguides may be facilitated by alignment surfaces and/or alignment marks on the component and/or waveguide substrate.

53 Claims, 17 Drawing Sheets

OTHER PUBLICATIONS

Inoue et al, Filter-embedded wavelength-division multiplexer for hybrid-integrated transceiver based on silica-based PLC, Electronics Letters, Apr. 25, 1996, Page(s) 847-848, vol. 32, No. 9.

Kitagawa et al, Hybrid Integration Technologies Using Planar Lightwave Circuits and Developed Components, IEICE Trans. Electron., Apr. 2002, Page(s) 1009-1017, vol. E8, No. 4.

Nakagawa et al, High Power and High Sensitivity Planar Lightwave Circuit Module Incorporating a Novel Passive Alignment Procedure, Journal of Lightwave Technology, Jan. 1998, Page(s) 66-72, vol. 16, No. 1.

Okuda et al, Solutions for high-performance optical transmission modules, OKI Technical Review, Apr. 2002, Page(s) 82-87, vol. 69, No. 2.

International Search Report—App. No. PCT/US03/32207 mailed Aug. 25, 2004 (six sheets total).

* cited by examiner

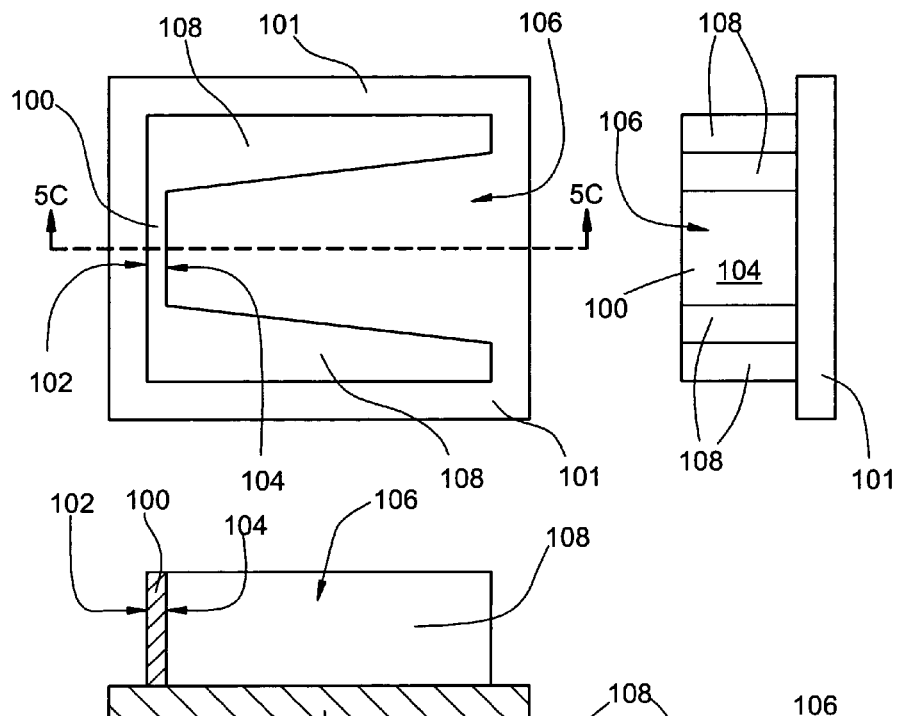
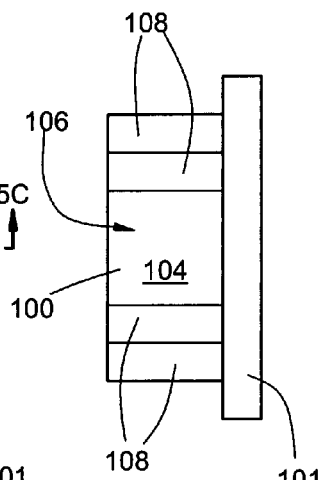
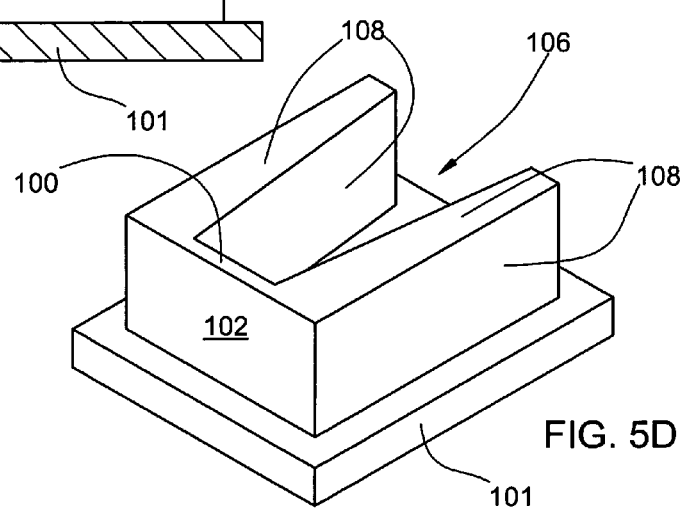

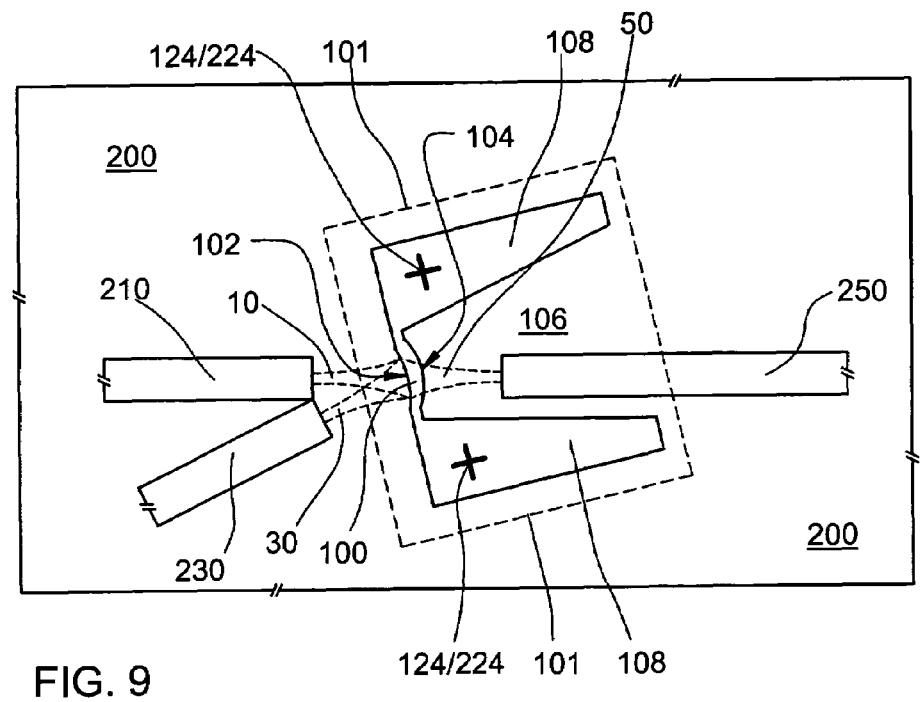
FIG. 9
FIG. 11A
FIG. 11B
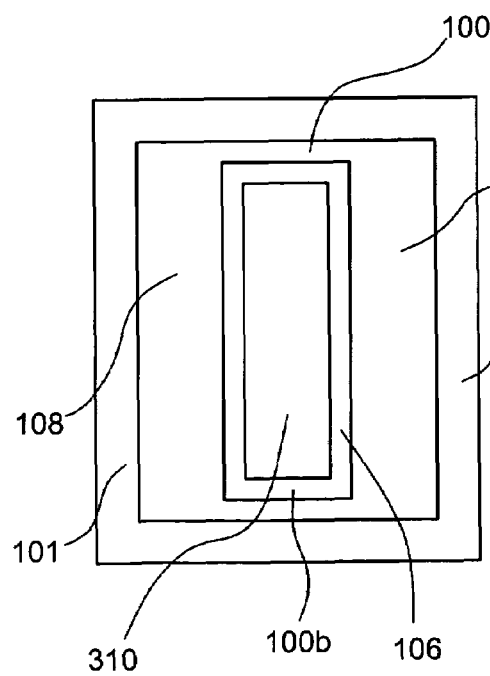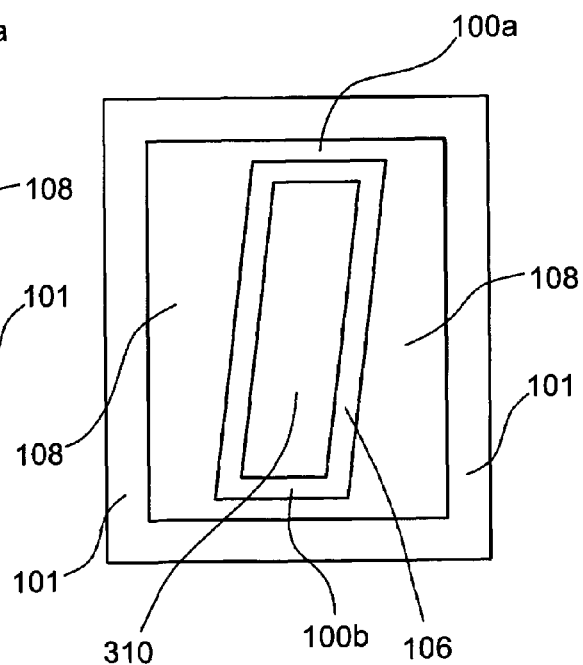

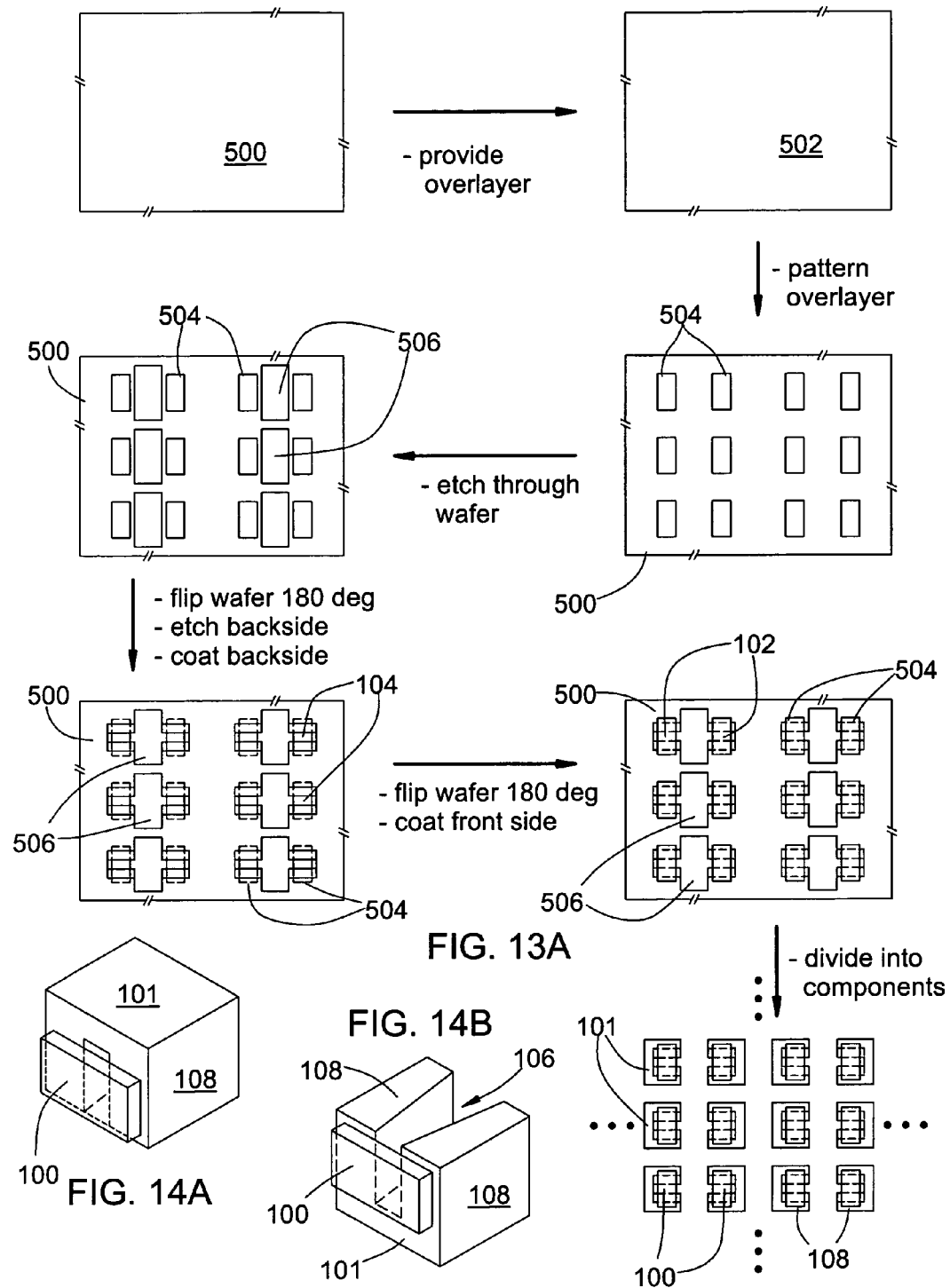

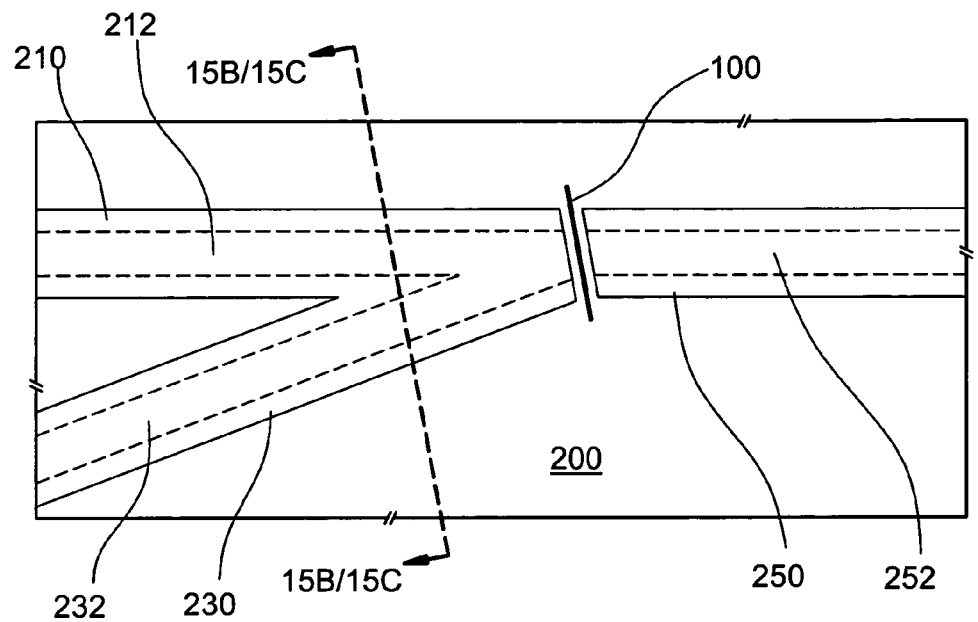
FIG. 15A
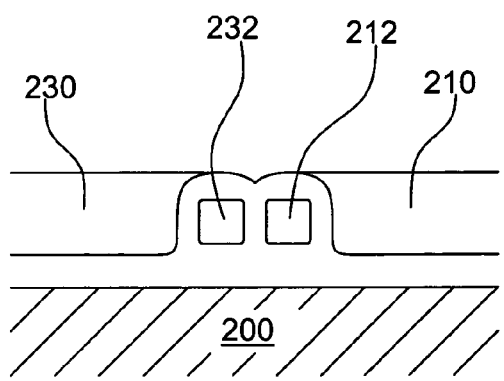 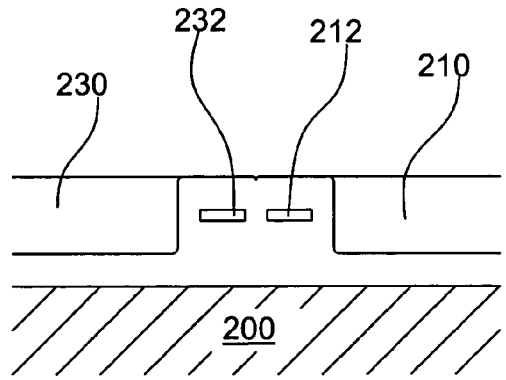
FIG. 15B          FIG. 15C

OPTICAL COMPONENT FOR FREE-SPACE OPTICAL PROPAGATION BETWEEN WAVEGUIDES

RELATED APPLICATIONS

This application claims benefit of prior-filed co-pending provisional App. No. 60/425,370 entitled "Reflective and/or transmissive optical component for free-space optical propagation between waveguides" filed Nov. 12, 2002 in the names of Henry A. Blauvelt and Joel S. Paslaski, said provisional application being hereby incorporated by reference as if fully set forth herein. This application claims benefit of prior-filed co-pending provisional App. No. 60/466,799 entitled "Low-profile-core and thin-core optical waveguides and methods of fabrication and use thereof" filed Apr. 29, 2003 in the names of David W. Vernooy, Joel S. Paslaski, and Guido Hunziker, said provisional application being hereby incorporated by reference as if fully set forth herein.

BACKGROUND

The field of the present invention relates to optical components. In particular, reflective and/or transmissive optical components are disclosed herein for free-space optical propagation between waveguides.

Planar optical waveguides are suitable for implementing a variety of optical devices for use in telecommunications and other fields. In addition to the planar waveguides, the planar waveguide substrate often also includes (by fabrication and/or placement thereon): alignment/support structures for placement of optical components/devices on the substrate; V-grooves and/or other alignment/support structures for positioning of optical fibers and/or fiber-optic tapers on the substrate; compensators, gratings, filters, and/or other optical elements/devices; electrical contacts and/or traces for enabling electronic access to active devices on the substrate; and/or other suitable components. Reflective and/or transmissive optical elements including, but not limited to, mirrors, beamsplitters, beam combiners, filters, lenses, and so forth are disclosed herein for use with one or more planar optical waveguides and for free-space optical propagation and/or end-coupling therebetween.

SUMMARY

An optical component may comprise a horizontal member with two side walls and a substantially transparent end wall protruding from the horizontal member. The end wall, side walls and horizontal member may partially enclose an interior volume, and optical functionality is imparted on at least a portion of the end wall. Examples of imparting optical functionality may include (but are not limited to): i) forming at least one optical coating on at least one surface of the optical component layer; ii) providing the optical component layer with at least one curved surface; iii) providing at least one surface of the end wall with a spatially-varying surface profile; iv) providing the optical component layer with at least one spatially-varying optical property; v) providing the optical component layer with at least one anisotropic optical property; and/or vi) providing the optical component layer with at least one spectrally-varying optical property.

The optical component may be formed on a substrate, with a portion of the substrate forming the horizontal member and with the side walls and end wall protruding from the substrate. The optical apparatus may instead be formed on a substrate, with the end wall comprising an optical component layer formed on the substrate with substrate material then removed from beneath it. The side walls and horizontal member are formed from substrate material separated from the rest of the substrate along with the optical component layer. Either of these methods may be implemented on a wafer scale for concurrent fabrication of many optical components. Optical functionality may be imparted on a wafer scale, at the bar level, and/or at the individual component level.

An optical assembly may comprise an optical component as described above mounted on a waveguide substrate, a planar waveguide formed on the substrate, and a second waveguide positioned on the substrate. The waveguides are optically end-coupled by either reflection from the optical component end wall or transmission through the optical component end wall. The optical component may be mounted on the waveguide substrate with an end portion of a planar waveguide received within the interior volume. Proper positioning of the optical component relative to the waveguides may be facilitated by alignment surfaces and/or alignment marks on the component and/or waveguide substrate.

Objects and advantages of optical components and/or assemblies disclosed herein may become apparent upon referring to the disclosed exemplary embodiments as illustrated in the drawings and set forth in the following written description and/or claims.

BRIEF DESCRIPTION OF THE DRAWINGS

FIGS. 5A, 5B, 5C, and 5D are top, end, side, and isometric views, respectively, of an exemplary optical component.

FIG. 9 is a schematic top view of an exemplary optical assembly.

FIGS. 11A and 11B are top views of exemplary dual optical components and waveguides.

FIGS. 12A, 12B, 12C, 13A, and 13B illustrate exemplary process sequences for fabricating optical components.

FIGS. 14A and 14B are schematic isometric views of exemplary optical components.

FIGS. 15A, 15B, and 15C are plan and cross-sectional views of optical waveguides.

Figure 1:
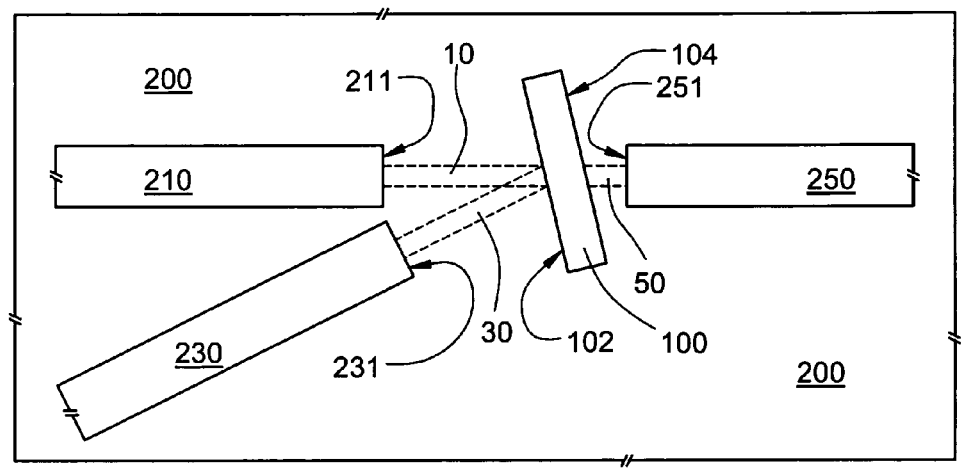
FIG. 1 is a schematic top view of a generic optical assembly.

It should be noted that the relative proportions of various structures shown in the Figures may be distorted to more clearly illustrate the present invention. Relative dimensions of various optical devices, optical waveguides, optical fibers, optical components, optical modes, alignment/support members, grooves, and so forth may be distorted, both relative to each other as well as in their relative transverse and/or longitudinal proportions. In many of the Figures the transverse dimension of an optical element is enlarged relative to the longitudinal dimension for clarity, which will cause variations of transverse dimension(s) with longitudinal position to appear exaggerated.

The embodiments shown in the Figures are exemplary, and should not be construed as limiting the scope of the present invention as disclosed and/or claimed herein.

DETAILED DESCRIPTION OF EMBODIMENTS

Many of the optical waveguides (including both optical fibers and planar waveguides) described herein have dimensions and design parameters so as to support only one or a few lowest-order optical modes. At visible and near-IR wavelengths, the resulting optical modes are typically a few μm up to about 10 or 15 μm in transverse extent. Depending on the nature of the waveguide, the guided optical mode(s) may be nearly cylindrically symmetric, or may differ substantially in transverse extent along substantially orthogonal transverse dimensions. Modes of these wavelengths and sizes typically exhibit substantially diffractive behavior beyond the end face of the supporting waveguide, typically becoming substantially convergent/divergent sufficiently far from the end face of the supporting waveguide (NA often greater than about 0.1). Accordingly, one or more of the following adaptations may be required to achieve a degree of optical power transfer above an operationally acceptable level between end-coupled waveguides: maintain the unguided optical pathlength between the waveguide end faces as small as practicable for a particular optical assembly; adapt the end portion of one or both waveguides for mitigating the diffractive behavior of the optical mode at the end face of the waveguide; insert one or more additional optical elements between the waveguides for refocusing, re-imaging, or otherwise manipulating the mode spatial properties for enhancing end-coupling between the waveguides.

It is often the case in a waveguide-based optical system or waveguide-based multi-component optical device that optical functionality is to be provided that cannot be readily implemented within a waveguide, and must therefore be provided by an optical component (reflective and/or transmissive) interposed in the optical path between end faces of waveguides, with unguided (i.e., free-space) optical propagation between the waveguides (reflected from a reflective optical component and/or transmitted through a transmissive optical component). In order to implement optical functionality in this way while maintaining overall transmission through the optical system at or above an operationally acceptable level, it is typically necessary to adapt the optical system or multi-component optical device as described in the preceding paragraph.

Figure 2:
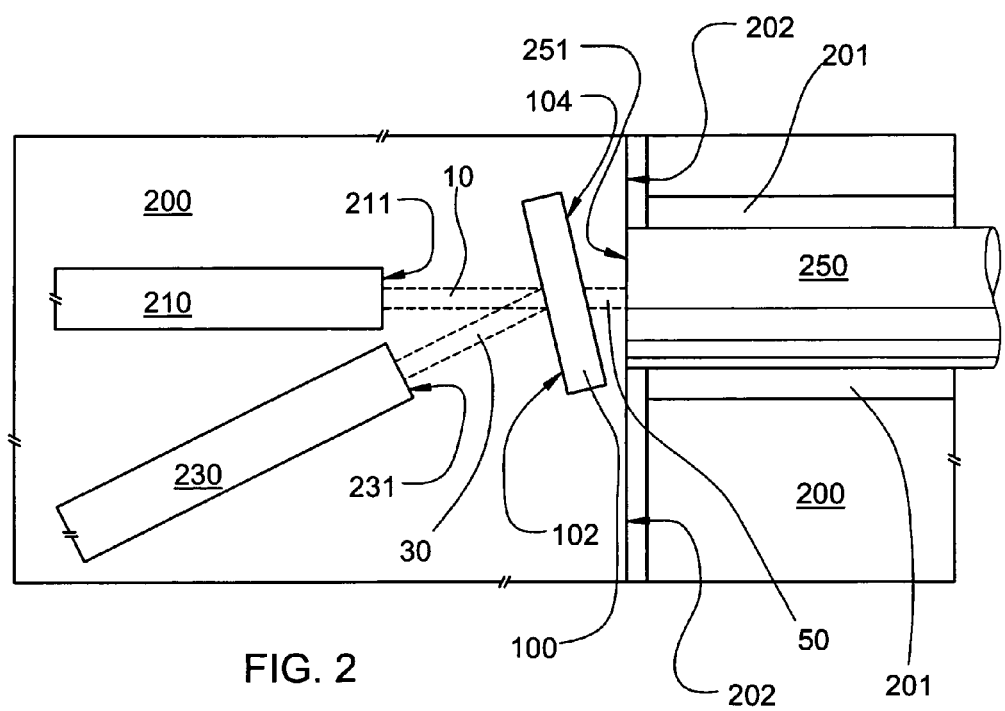
FIG. 2 is a schematic top view of a generic optical assembly.
Figure 3A:
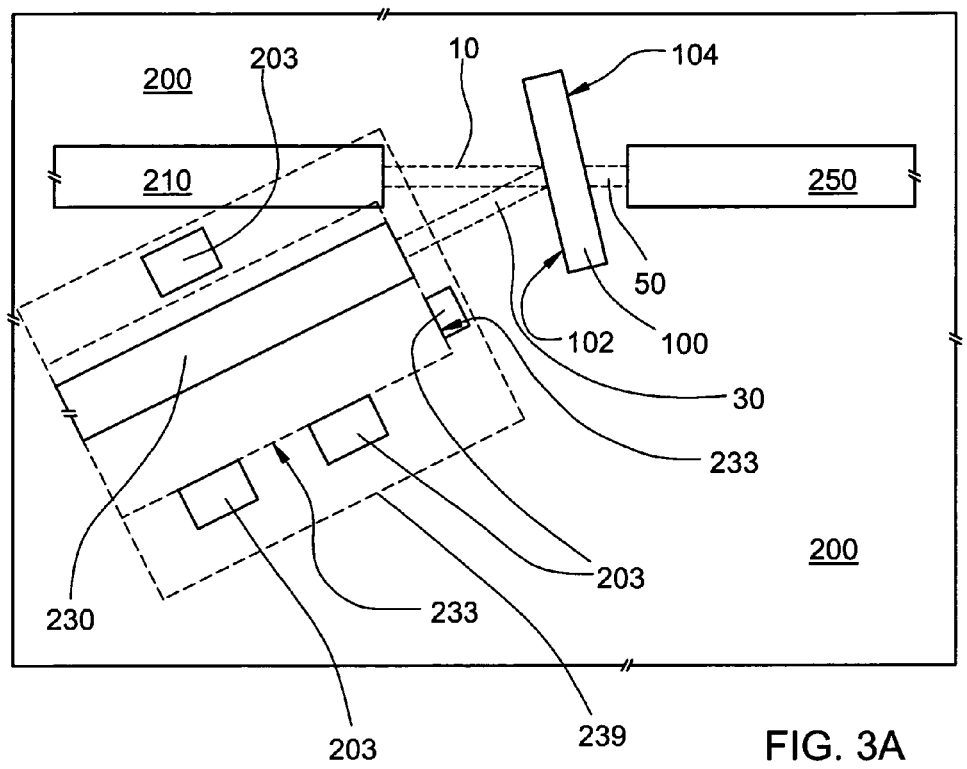
FIGS. 3A and 3B are schematic top and elevation views, respectively, of a generic optical assembly.
Figure 3B:
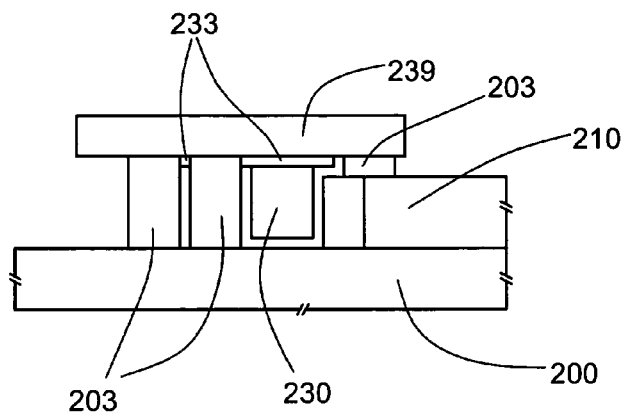

FIG. 1 is a schematic diagram of an optical assembly including an optical component 100 positioned on a planar waveguide substrate 200 along with optical waveguides 210, 230, and 250, at least one of which is a planar waveguide formed on substrate 200. Optical power may propagate through each of waveguides 210/230/250 in one or more of the respective propagating modes supported thereby. Each waveguide 210/230/250 terminates at respective end faces 211/231/251, through which optical power may enter/exit the respective waveguide by end-transfer of optical power (equivalently: end-transfer, end coupling, end-coupled optical power transfer, end-coupled transfer of optical power, end-coupled transfer) with respective freely propagating optical beams 10/30/50 (freely propagating indicating lack of transverse guiding as provided by a waveguide). Waveguides 210 and 230 and optical component 100 may be suitably arranged so as to enable reflectively-coupled end-transfer of optical power between waveguides 210 and 230 by reflection of optical beams 10 and/or 30 from surfaces 102 and/or 104 of optical component 100 (including double-pass transmission through component 100 for reflection from surface 104; reflection only from surface 102 depicted in FIGS. 1, 2, 3A/3B, and 4A/4B). Similarly, waveguides 210 and 250 and optical component 100 may be suitably arranged so as to enable transmissively-coupled end-transfer of optical power between waveguides 210 and 250 by transmission of optical beams 10 and/or 50 through optical component 100 and surfaces 102 and 104 thereof.

Optical component 100 may be adapted in myriad ways for modifying the intensity, spatial characteristics, polarization characteristics, and/or spectral characteristics of optical beams reflected therefrom and/or transmitted therethrough (i.e., for imparting optical functionality on the optical component). The generic optical assembly of FIG. 1 may therefore be employed for implementing a wide array of optical functionality via optical component 100 (which may also serve to enhance end-coupling between the waveguides) while remaining within the scope of the present disclosure and/or the appended claims. Examples of imparting optical functionality may include, but are not limited to: i) forming at least one optical coating on at least one surface of the optical component; ii) providing the optical component with at least one curved surface; iii) providing at least one surface of the optical component with a spatially-varying surface profile; iv) providing the optical component with at least one spatially-varying optical property; v) providing the optical component with at least one anisotropic optical property; and/or vi) providing the optical component with at least one spectrally-varying optical property. More specific examples of adaptations of optical component 100 for imparting optical functionality may include (without being limited to): spatial orientation of surfaces 102/104; curvature in one or two dimensions of one or both of surfaces 102/104; surface discontinuities (such as facet boundaries) on one or both of surfaces 102/104; reflective, partially reflective, and/or anti-reflective coatings on one or both of surfaces 102/104; diffractive structures implemented on one or both of surfaces 102/104 and/or within component 100; refractive index spectral and/or spatial discontinuities, gradients, and/or modulations within component 100; birefringent and/or dichroic properties (with respect to linear and/or circular polarization) within component 100; birefringent and/or dichroic coatings (with respect to linear and/or circular polarization) on one or both of surfaces 102/104; Faraday rotation within component 100; optical absorption/transmission within component 100; spectral and/or spatial discontinuities, gradients, and/or modulations of any one or more of the foregoing. Such adaptations of optical component 100 may be position dependent or independent, may be wavelength dependent or independent, and may be polarization dependent or independent, as needed for implementation of particular functionalitie(s) to be provided by the optical assembly of FIG. 1.

Figure 4A:
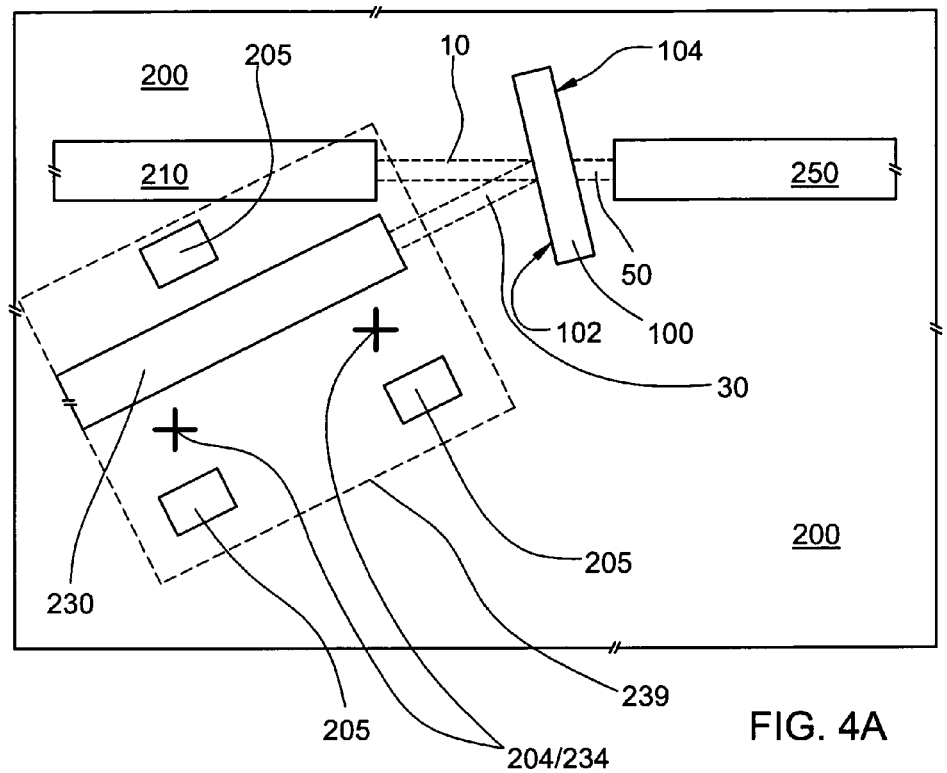
FIGS. 4A and 4B are schematic top and elevation views, respectively, of a generic optical assembly.
Figure 4B:
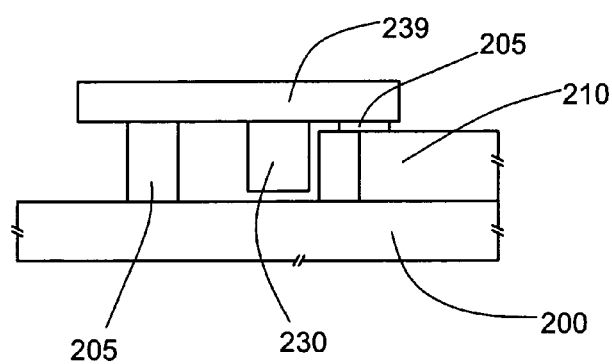

At least one of waveguides 210/230/250 may be implemented as a planar waveguide formed on substrate 200. If all three waveguides are planar waveguides formed on substrate 200, spatially-selective material processing techniques may be employed for sufficiently accurate positioning (within operationally acceptable tolerances) of the waveguides on the substrate for enabling intended functionality of the optical assembly. If one or two of waveguides 210/230/250 are not planar waveguides on substrate 200, substrate 200 may be adapted for suitably mounting such waveguide(s) relative to planar waveguide(s) thereon for enabling (within operationally acceptable tolerances) intended functionality of the optical assembly. For example, one or two of waveguides 210/230/250 may comprise an optical fiber (waveguide 250, for example, as shown schematically in FIG. 2). Substrate 200 may be provided with corresponding V-groove(s) 201, alignment edge(s) 202, and/or other suitable alignment structure(s) for enabling sufficiently accurate passive positioning (as opposed to active positioning, in which functioning of the optical assembly or sub-assembly thereof is monitored to determine positional accuracy) of the optical fiber(s) relative to the planar waveguide(s) (within operationally acceptable tolerances). In another example, one or two of waveguides 210/230/250 (waveguide 230, for example, as shown schematically in FIGS. 3A/3B) comprises a planar waveguide formed on a corresponding separate waveguide substrate 239. Substrate 200 and/or substrate 239 may be provided with suitable support/alignment structures 203 and 233, respectively, for enabling sufficiently accurate passive positioning (within operationally acceptable tolerances) of waveguide 230 relative to waveguides 210/250. Alternatively, substrate 200 may be provided with support structure(s) 205 and substrates 200 and 239 may be provided with alignment marks 204 and 234, respectively, for enabling sufficiently accurate vision-based passive positioning (human vision or machine vision; within operationally acceptable tolerances) of waveguide 230 relative to waveguides 210/250 (shown schematically in FIG. 4).

Optical component 100 may be adapted for enabling sufficiently accurate passive positioning (within operationally acceptable tolerances) on substrate 200 relative to waveguides 210/230/250 and for in turn enabling intended functionality of the optical assembly. An embodiment of component 100 suitable for placement on substrate 200 near an end face of a planar waveguide (waveguide 250, for example) is shown in FIGS. 5A/5B/5C/5D. Optical component 100 is shown formed on a component substrate that has been spatially-selectively processed to form a partially enclosed pocket or interior volume 106 between side walls 108, a horizontal member 101, and an end wall, the end wall forming optical component 100. The optical component 100 includes in this exemplary embodiment substantially flat, substantially vertical inner and outer surfaces 102 and 104, respectively. The other end of the interior volume 106 is left open in this example. Horizontal member 101 extends beyond optical component 100 and side walls 108 in this example, but this need not be the case.

Use of a substantially homogeneous material for forming component 100 results in substantially uniform optical properties within component 100, while use of an inhomogeneous material (having one or more spatial discontinuities, gradients, and/or modulations) results in similarly inhomogeneous properties within component 100. Component 100, horizontal member 101, and side walls 108 may be formed by spatially-selective processing of the substrate material. Alternatively, an overlayer comprising one or more different materials maybe applied to a substrate and spatially-selectively processed to form component 100 and side walls 108; in this case horizontal member 101 may comprise one or both of substrate material and overlayer material(s). Optical component 100 may be as thin as practicable for maintaining structural integrity without requiring excessive separation between ends of waveguides 210/230/250. Component 100 may typically range between about 10 µm and about 50 µm in thickness, often between about 20 µm and about 30 µm. Thinner optical components may be employed if fabricated from sufficiently robust material(s) and handled with sufficient care. Thicker optical components 100 may be employed (up to 100 µm or more) if necessary or desirable for implementing particular optical functionality, and/or for laterally off-setting reflected beams from the two component surfaces in an off-normal incidence geometry. One or both of surfaces 102/104 may be provided with an optical coating for providing optical functionality. Spatially selective material processing may be employed to provide one or more of: one or more alignment edges and/or vertical and/or horizontal alignment surfaces on side walls 108 and/or horizontal member 101 for engaging corresponding alignment/support structures on waveguide substrate 200; one or more alignment marks 124 for enabling vision-based positioning of component 100 on correspondingly marked waveguide substrate 200; and/or one or more solder pads 123 for securing component 100 to substrate 200.

Figure 6A:
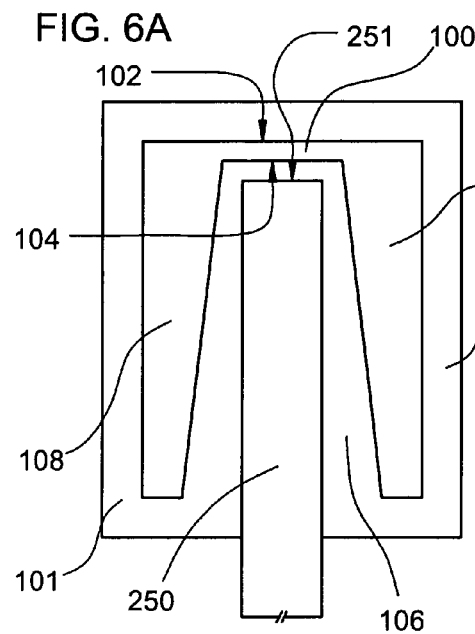
FIGS. 6A, 6B, 6C, and 6D are top views of exemplary optical components and waveguides.
Figure 7A:
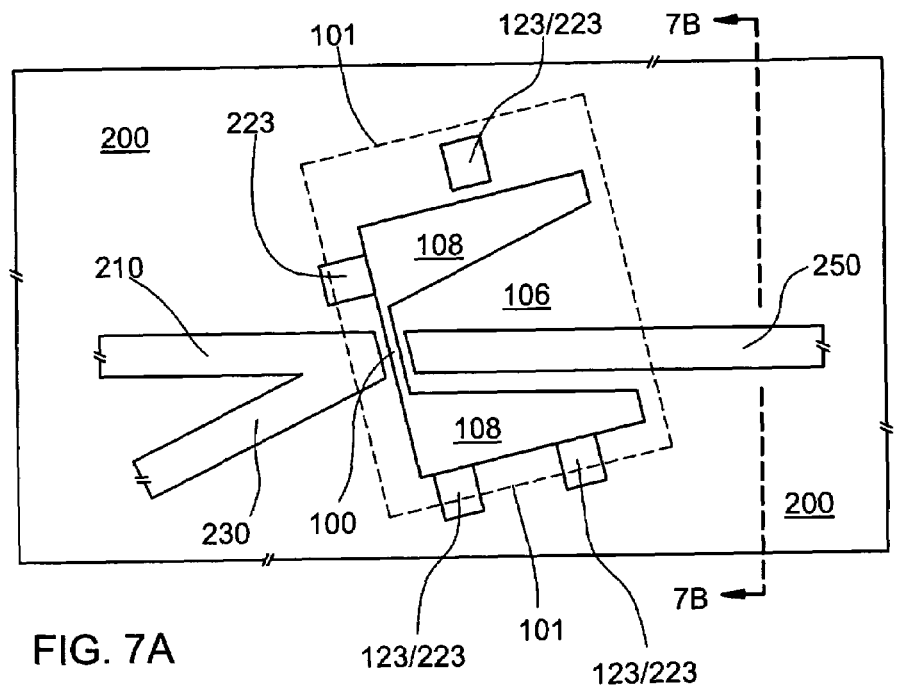
FIGS. 7A and 7B are schematic top and elevation views, respectively, of an exemplary optical assembly.
Figure 7B:
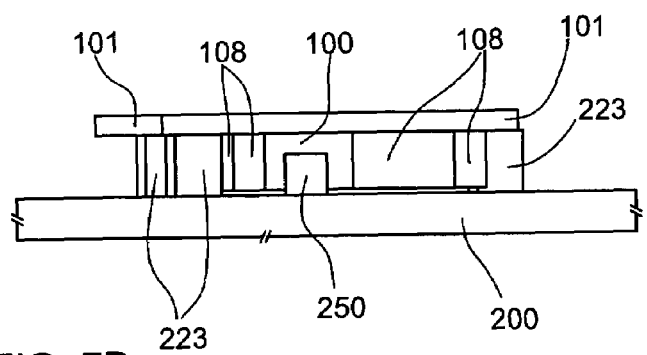

After fabrication, horizontal member 101 with optical component 100 thereon is inverted, positioned on substrate 200, and secured thereto using so-called "flip-chip" mounting (as shown in FIGS. 7A/7B and 8A/8B). In order to reduce the distance separating the ends of waveguides 210/230/250 (thereby somewhat mitigating diffractive end-coupling losses that may be present) while nevertheless accommodating optical component 100 and secure mounting/support thereof on substrate 200, at least an end portion of one of the planar waveguides (waveguide 250 in the illustrated examples) may form a ridge protruding from an adjacent area of substrate 200, so that upon flip-chip mounting of optical component 100 on substrate 200, the end portion of waveguide 250 is received within pocket 106 with surface 104 of optical component 100 near end face 251 of waveguide 250 (FIGS. 6A/6B/6C/6D). Pocket or interior volume 106 may range from about 10 µm in height up to several tens of µm high or more to accommodate typical planar waveguides, and may be made any suitable width required to accommodate a planar waveguide. The width of pocket 106 and/or the positions/orientations of side walls 108 thereof may be configured to permit placement of optical component 100 at a required angle (within operationally acceptable tolerances; as illustrated in the examples of FIGS. 6A/6B/6C/6D, 7A/7B, and 8A/8B) relative to waveguide 250 (and therefore also waveguides 210/230). To reduce diffractive losses while facilitating mounting of component 100 between the waveguides, the waveguides may be positioned on the substrate so that upon mounting of the optical component 100, each of the waveguide end faces is within about 5 µm of a facing component surface 102 or 104. Larger separations between the waveguide end faces and the optical component surfaces may also fall within the scope of the present disclosure and/or appended claims.

Figure 6B:
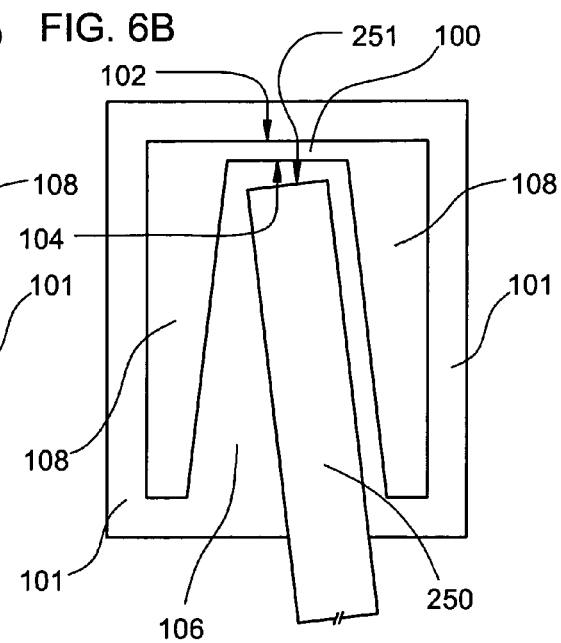
Figure 6C:
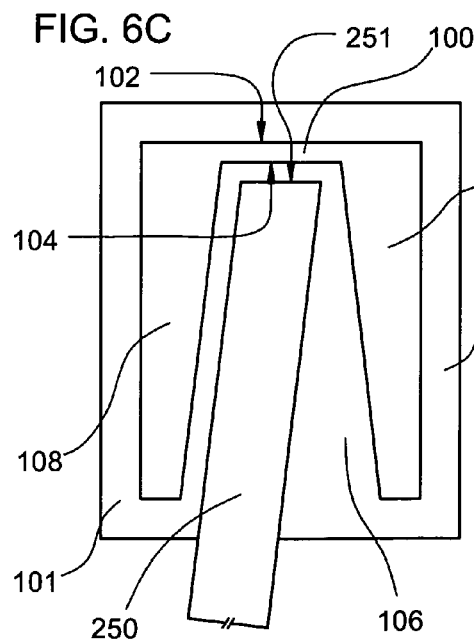
Figure 6D:
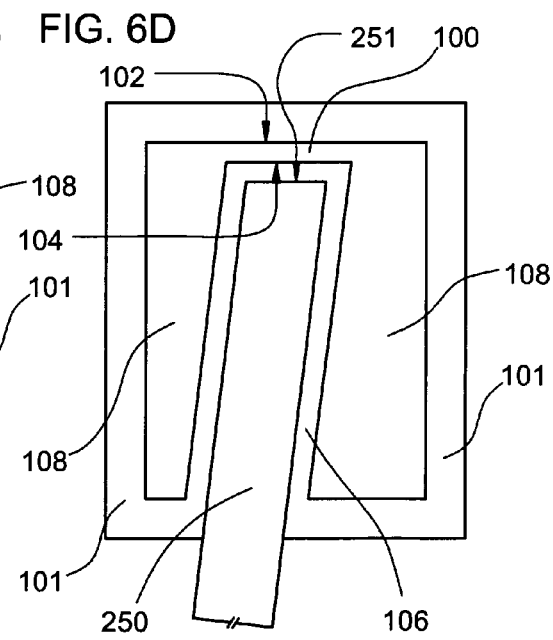

FIG. 6A shows an example of an optical component at substantially normal incidence with respect to component 100, with the end face of the waveguide also at substantially normal incidence. FIG. 6B shows a non-normal optical component with a substantially normal waveguide end face. End faces of waveguides 210, 230, and/or 250 may be adapted for enabling close positioning of a non-normal optical component 100 without excessive separation between the waveguides. In the examples of FIGS. 6C/6D, 7A/7B, and 8A/8B the end faces are angled (i.e., not substantially orthogonal to the propagation direction of the respective waveguide), thereby allowing a non-normal optical component 100 to be positioned closer to end faces of each of the waveguides.

In order to reduce unwanted reflective losses at waveguide end faces and at any nominally non-reflective surface of component 100 (when the waveguide(s) and optical component are of similar refractive index), an index-matched embedding medium may be interposed between the waveguide end faces and the surfaces of the optical component. This may be accomplished by embedding the assembled waveguides and optical component in a substantially index-matched embedding medium, such as a polymer. A solution or suspension of polymer precursor is applied and flows into spaces between optical surfaces. After curing of the polymer, the waveguides and optical component and waveguides are embedded. In order to facilitate flow of the index-matching (or "potting") medium between the inner surface 104 of the optical component and the end face of the waveguide received in the pocket of the optical component, one or more openings may be provided through one or both side walls 108, around component 100 on the end wall, and/or through component substrate 101. Even if waveguide and component materials have substantially differing refractive indices, an embedding material may still reduce unwanted reflective losses (relative to air or vacuum).

If only transmissively-coupled end-transfer is intended, an optical component 11 fabricated as disclosed herein may be employed at normal or near normal incidence (illustrated in FIG. 6A), although non-normal incidence may be employed as well. Optical components for which only transmissive optical functionality may be required may include spectral notch, short-pass, long-pass, and/or band-pass filters, for example, intended to reject one or more incident spectral components that need not be directed elsewhere. Such functionality may be readily provided by one or more optical coating(s) on one or both of surfaces 102 and 104 of optical component 100. Other examples of transmissive-only optical components may fall within the scope of the present disclosure and/or appended claims. Non-normal incidence with respect to component 100 (as illustrated in FIGS. 6B/6C/6D, 7A/7B, and 8A/8B) typically may be required for including reflectively-coupled end-transfer. Such components may include as examples the various spectral filter types mentioned hereinabove, in which the rejected spectral component(s) must be directed to a specific location. Other examples of transmissive plus reflective optical functionality may fall within the scope of the present disclosure and/or appended claims.

Figure 7C:
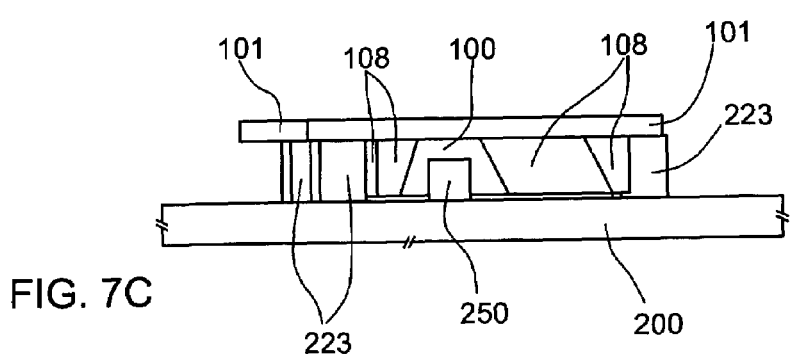
FIG. 7C is a schematic elevation view of an exemplary optical assembly.
Figure 8A:
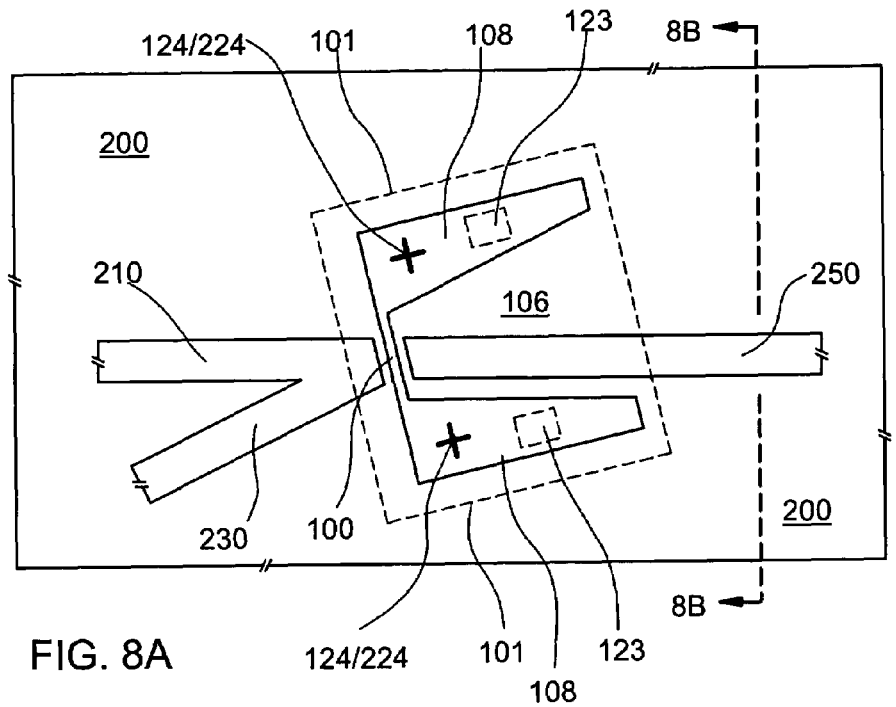
FIGS. 8A and 8B are schematic top and elevation views, respectively, of an exemplary optical assembly.
Figure 8B:
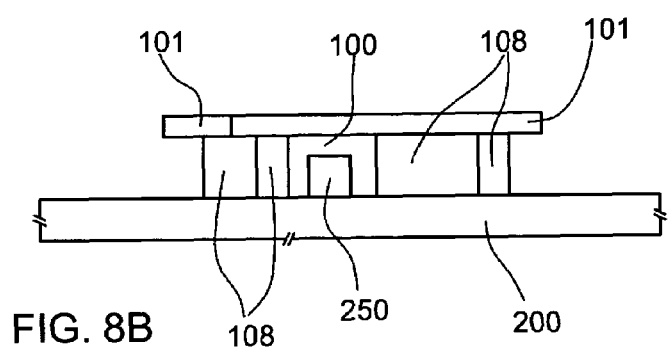
Figure 8C:
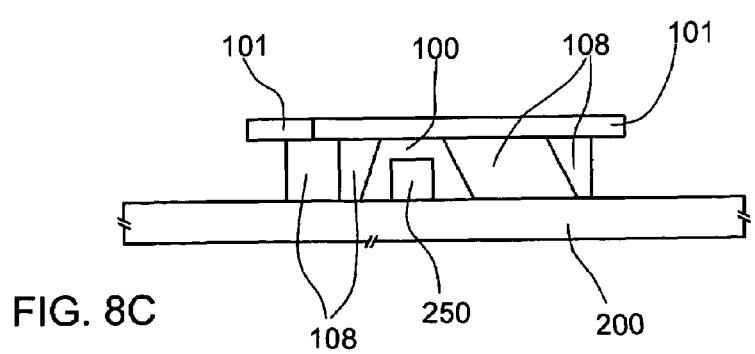
FIG. 8C is a schematic elevation view of an exemplary optical assembly.
Figure 16:
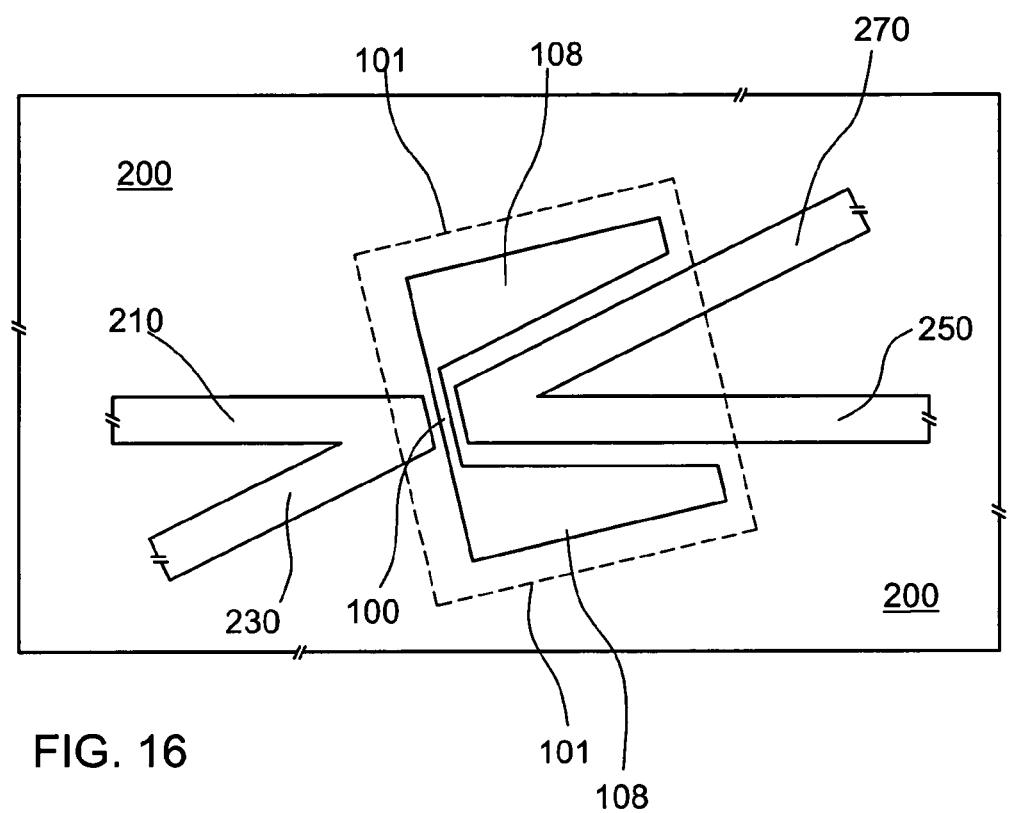
FIG. 16 is a schematic top view of an exemplary optical assembly.

It may be desirable to suppress at least a portion of unwanted light reflected, transmitted, and/or scattered by optical component 100. For example, a fraction of light emerging from waveguide 230 and reflected from optical component 100 into waveguide 210 may leak through component 100. Given the angular misalignment of waveguides 230 and 250, it may be unlikely in many cases that a significant amount of this unwanted transmitted light would enter waveguide 250. It may nevertheless be desirable to reduce the amount of such leakage light reaching other components or devices on substrate 200. Side walls 108 may be adapted for absorbing such unwanted light (at an operating wavelength for component 100) transmitted through component 100 from waveguide 230, for example. Alternatively, as shown in FIGS. 7C and 8C, side walls 108 may be tilted and suitably coated so as to reflect such unwanted transmitted light downward into the substrate 200, to be absorbed or transmitted away from components on the substrate surface. These adaptations may also serve to suppress unwanted reflection from component 100 of light emerging from waveguide 250 for transmission through component 100 and into waveguide 210. Alternatively, an additional waveguide 270 may be positioned on substrate 200 for receiving unwanted transmitted or reflected optical signals (from waveguides 230 and 250, respectively), as shown in FIG. 16. Such a "beam dump" waveguide may convey unwanted light away from sensitive components on substrate 200, or may be adapted in any suitable manner for absorbing or dissipating the unwanted light. It should be noted that the exemplary embodiment of FIG. 16 may also be employed for implementing a four-port optical assembly, in which any or all of waveguides 210, 230, 250, and/or 270 may be used for transmitting and/or receiving optical signals reflected and/or transmitted by component 100.

Reflectively-coupled end-transfer may be implemented at any suitable angle of incidence on optical component 100. Many optical coatings and/or components exhibit properties which vary with angle of incidence, and which may have wavelength and/or polarization dependences that in turn depend on angle of incidence (further complicated by the range of incident angles present in a convergent or divergent incident beam). These dependences are typically at a minimum near normal incidence and increase with increasing angle of incidence, which may in some instances impose an upper limit on the angle of incidence that may be used for a given optical component 100. A lower limit for a usable angle of incidence may be determined in part by the degree of diffractive losses that may be tolerated in the optical assembly. In FIGS. 7A and 8A, waveguides 210 and 230 are shown merging as they approach component 100. Parasitic optical losses increase with increasing length of the merged portion of the waveguides, which in turn increases with decreasing angle of incidence (and therefore a decreased angle of separation between the waveguides). In any given assembly the optical performance required (which may be degraded by a larger angle of incidence) may be balanced against optical loss induced by the merged section of the waveguides (typically worsened by a smaller angle of incidence). Geometric and space constraints on the waveguide substrate may also come into play. A range of compromise values is typically available for a particular optical assembly incorporating particular optical functionality via the optical component 100. Many optical assemblies may have an incidence angle below about 45° (i.e., reflectively coupled waveguides forming an angle less than about 90°), often between about 7° and about 18° (i.e., reflectively coupled waveguides forming an angle between about 15° and about 35°). However, any 11 suitable angle of incidence on optical component 100 (and corresponding angle between reflectively coupled waveguide) shall fall within the scope of the present disclosure and/or appended claims.

A waveguide having a thin core (i.e., less than about 3 µm high, often less than about 1 µm high) may be employed for reducing optical losses at small incidence angles on optical component 100, as shown in FIGS. 15A–15C. The presence of one of the cores 212 and 232 gives rise to parasitic optical loss in the other, and this parasitic loss is roughly proportional to the cross-sectional area of the interfering core. For given optical mode sizes supported by waveguides 210 and 230, reducing the cross-sectional area of the respective cores 212 and 232 correspondingly reduces the level of parasitic optical loss from one core induced by the other. For a given angle between the waveguides, use of thin waveguide cores (as shown in the cross-section of FIG. 15C) reduces parasitic optical losses relative to thicker waveguide cores (as shown in the cross-section of FIG. 15B). For example, for waveguides separated by 20°, cores of about 6–7 µm in height and width may exhibit optical loss of about 0.8 dB or more. In contrast, for the same angular separation, thin cores about 0.5 µm high by about 5 µm wide may exhibit only about a 0.2 dB optical loss. In addition, more complete and more uniform filling of the acute angle between the cores with cladding material may further reduce optical losses for thin cores relative to thicker cores (without the need for high temperatures or additional processing steps for achieving re-flow of cladding material).

An example of multiple functionalities provided by optical component 100 is shown in FIG. 9. In this example, component 100 may act as a spectral filter for directing a first spectral component (near $\lambda_1$) of an incident optical signal (incident optical beam 10) from planar waveguide 210 to planar waveguide 230 (reflected optical beam 30), and transmitting a second spectral component (near $\lambda_2$) of the incident optical signal from planar waveguide 210 to planar waveguide 250 (transmitted optical beam 50). Surface 102 may be provided with a suitable spectrally-selective reflective coating for substantially reflecting the first spectral component (near $\lambda_1$) while substantially transmitting the second spectral component (near $\lambda_2$), thereby providing the spectral filter functionality. Surface 104 may be provided with a suitable anti-reflective coating (near $\lambda_2$) if necessary or desirable. In addition, surfaces 102 and/or 104 may be provided with curvature (in one or both dimensions; only shown in the horizontal dimension in FIG. 9) for improving end-coupling between waveguides 210 and 230 and/or between waveguides 210 and 250. In the exemplary embodiment of FIG. 9, surface 102 is shown as a concave surface. The curvature of surface 102 may be designed to act as a focusing mirror, receiving incident optical beam 10 and producing reflected optical beam 30 with reduced divergence or a degree of convergence, thereby improving end-coupling between waveguides 210 and 230. Curved surface 102 may be designed to substantially mode match waveguides 210 and 230. The curvature of surface 104 may be designed so that component 100, with curved surfaces 102 and 104, acts as a focusing lens (a meniscus lens in this example), receiving incident optical beam 10 and producing transmitted optical beam 50 with reduced divergence or a degree of convergence, thereby improving end-coupling between waveguides 210 and 250. Curved surfaces 102 and/or 104 may be designed to substantially mode match waveguides 210 and 250. In addition to curved surfaces 102 and/or 104, component 100 may include index-gradient material for providing focusing of transmitted optical beam 50. If the reflected beam 30 is reflected from surface 104 instead of surface 102, both curved surfaces as well as any index gradient present will influence mode matching between waveguides 210 and 230.

Many other examples of specific optical functionalities, alone or in various combinations, may be provided by an optical component 100 that fall within the scope of the present disclosure and/or appended claims. Such functionalities may be provided by suitable adaptation of component 100 and/or one or both of surfaces 102 and 104 thereof. Examples of such functionalities may include, but are not limited to: spectral filtering, spectral separation, spectral dispersion (spatial and/or temporal), spectral manipulation (amplitude and/or phase), spatial manipulation (amplitude and/or phase), attenuation, focusing, de-focusing, collimating, mode matching, polarization selection (linear and/or circular), polarization retardation (linear and/or circular), polarization manipulation, optical isolation, aperturing, vignetting, beam splitting, beam combining, multiplexing, de-multiplexing, bi-directional receiving/transmitting, and so forth.

Figure 10A:
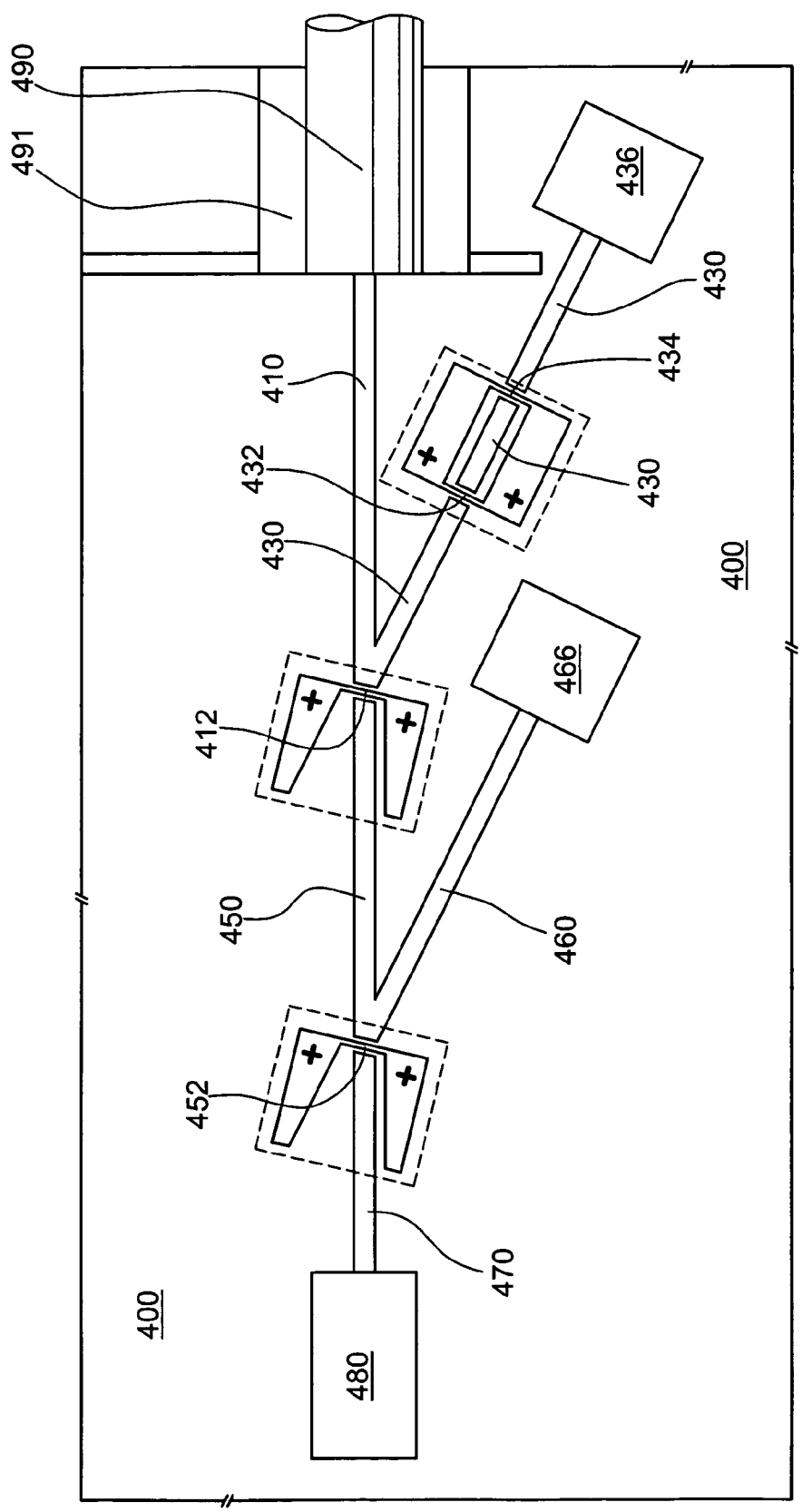
FIG. 10 is a schematic top view of an exemplary optical assembly.
Figure 10B:
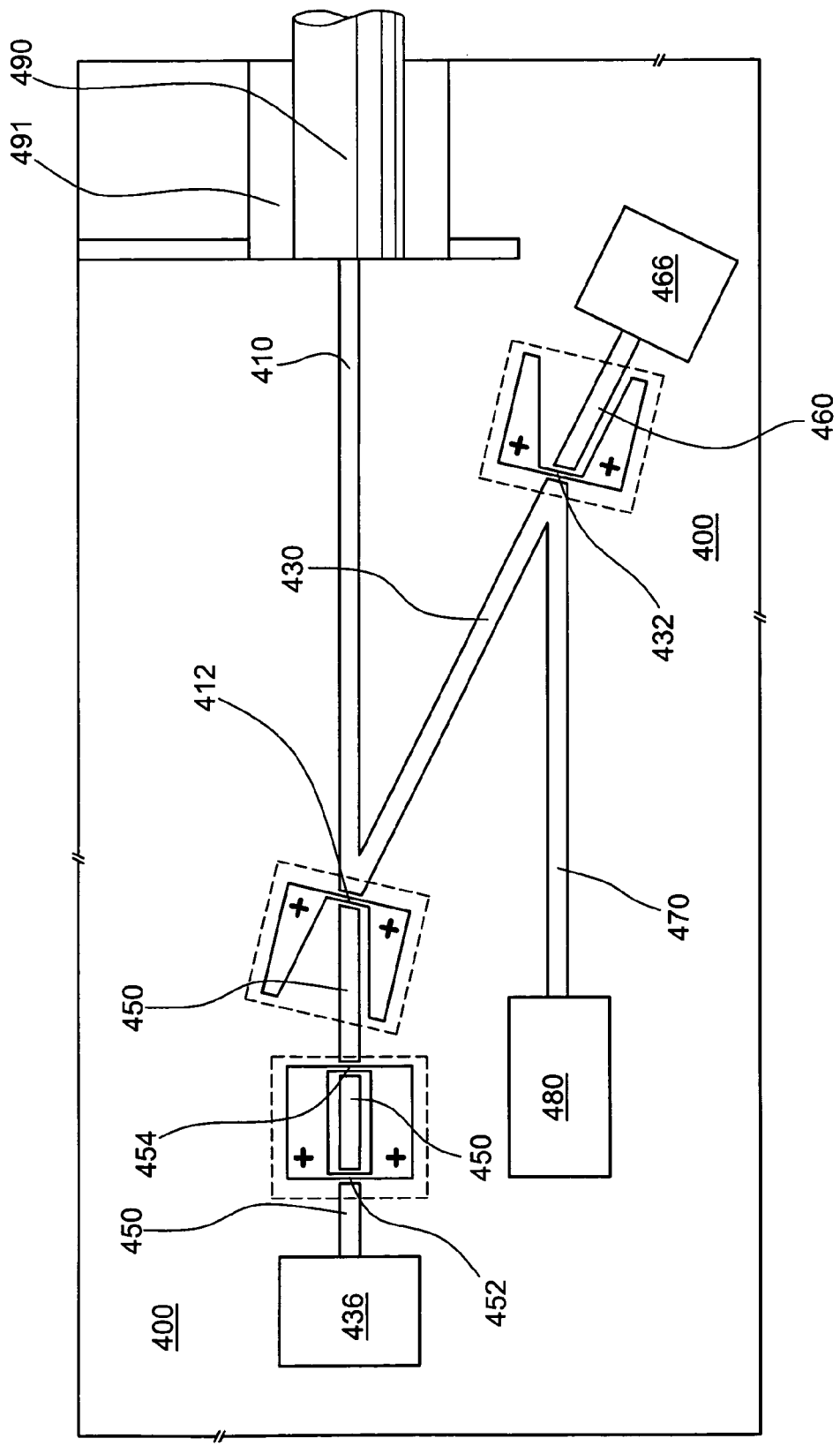

Exemplary optical assemblies are shown in FIGS. 10A and 10B, each arranged for functioning as a bidirectional optical transceiver. Planar waveguides 410/430/450/460/470 are provided on transceiver substrate 400. Two incoming wavelength-multiplexed optical signals (centered near $\lambda_1$, and $\lambda_2$, respectively) enter the bidirectional transceiver from an optical fiber 490 end-coupled to waveguide 410. Optical fiber 490 is received in V-groove 491 on substrate 400 for positioning the optical fiber relative to waveguide 410. Waveguide 410 and optical fiber 490 may be adapted for optical power transfer therebetween in any suitable manner, including transverse-transfer (as taught in U.S. Patent Application Pub. No. 2003/0081902) and end-transfer. It is typically the case that the incoming optical signals arrive at the end of optical fiber 490 in an unknown and varying polarization state. A modulated laser source 480 (optical output centered near at $\lambda_3$) is shown coupled to waveguide 470. Output of laser source 480 may be transferred into waveguide 470 in any suitable manner, including end-transfer or transverse-transfer. Support/alignment structures and/or alignment markings (not shown in FIGS. 10A and 10B) may be provided on laser source 480 and substrate 400 for positioning and securing laser source 480 on substrate 400 relative to waveguide 470.

A first spectral filter 412 as described hereinabove is positioned between waveguides 410 and 450. In FIG. 1A, filter 412, may be designed to substantially reflect the first incoming optical signal ($\lambda_1$) while substantially transmitting the second incoming optical signal ($\lambda_2$) and the laser output signal ($\lambda_3$). Waveguide 430 may be positioned to receive the reflected first incoming optical signal and convey it to a photodetector 436 for conversion into a first electrical output signal. Second and third spectral filters 432 and 434 may be provided within gaps in waveguide 430 for reflecting the second incoming optical signal ($\lambda_2$) while substantially transmitting the first incoming optical signal ($\lambda_1$), thereby substantially isolating photodetector 436 from undesired reflection of the second incoming optical signal ($\lambda_2$) from spectral filter 412. Any photodetector having suitable performance characteristics (bandwidth, wavelength response, and so forth) may be employed. A fourth spectral filter 452 is provided between waveguides 450 and 470, and may be designed to substantially reflect the second incoming optical signal ($\lambda_2$) while substantially transmitting the laser output signal ($\lambda_3$). Waveguide 460 may be positioned to receive the reflected second incoming optical signal and convey it to a photodetector 466 for conversion into a second electrical output signal. Additional spectral filters may be provided along waveguide 460, if needed or desired, for substantially isolating photodetector 466 from other optical signals ($\lambda_1$ and/or $\lambda_3$). Any photodetector having suitable performance characteristics (bandwidth, wavelength response, and so on) may be employed. Laser output is transmitted along waveguide 470, through spectral filter 452, along waveguide 450, through spectral filter 412, along waveguide 410, and into optical fiber 490. In some instances undesirable reflection of the output optical signal from spectral filters 412 and 452 may be of little consequence (other than overall attenuation of the output signal), since the reflections are not in a direction that affects other components or devices on the transceiver. Filters 412 and 452 may be adapted, if needed or desired, for absorbing or redirecting unwanted reflection of the output optical signal (as described hereinabove), or additional waveguide(s) may be provided on substrate 400 for receiving such unwanted reflected light (as described hereinabove).

In FIG. 10B, filter 412, may be designed to substantially transmit the first incoming optical signal ($\lambda_1$) while substantially reflecting the second incoming optical signal ($\lambda_2$) and the laser output signal ($\lambda_3$). Waveguide 450 may be positioned to receive the transmitted first incoming optical signal and convey it to a photodetector 436 for conversion into a first electrical output signal. Second and third spectral filters 452 and 454 may be provided within gaps in waveguide 450 for reflecting the second incoming optical signal ($\lambda_2$) and perhaps also the output optical signal ($\lambda_3$), while substantially transmitting the first incoming optical signal ($\lambda_1$), thereby substantially isolating photodetector 436 from any undesired transmission of other optical signals ($\lambda_2$ and/or $\lambda_3$) through spectral filter 412. Any photodetector having suitable performance characteristics (bandwidth, wavelength response, and so forth) may be employed. A fourth spectral filter 432 is provided between waveguides 430 and 460, and may be designed to substantially transmit the second incoming optical signal ($\lambda_2$) while substantially reflecting the laser output signal ($\lambda_3$). Waveguide 460 conveys the second incoming optical signal ($\lambda_2$) to a photodetector 466 for conversion into a second electrical output signal. Additional spectral filters may be provided along waveguide 460, if needed or desired, for substantially isolating photodetector 466 from other optical signals ($\lambda_1$ and/or $\lambda_3$). Any photodetector having suitable performance characteristics (bandwidth, wavelength response, and so on) may be employed. Laser output signal ($\lambda_3$) is transmitted along waveguide 470, reflected from spectral filter 432, transmitted along waveguide 430, reflected from spectral filter 412, transmitted along waveguide 410 and into optical fiber 410. Filters 412 and 432 may be adapted, if needed or desired, for absorbing or redirecting unwanted transmission of the output optical signal (as described hereinabove), or additional waveguide(s) may be provided on substrate 400 for receiving such unwanted transmitted light (as described hereinabove).

Which of the configurations of FIGS. 10A and 10B, or variants thereof, is employed may depend on a variety of factors, such as the level isolation required for the laser and/or photodetectors, low incoming signal levels, detection efficiency, laser output power, device size constraints, and so forth. These embodiments are only two of many examples of multi-component optical devices that may be implemented using planar waveguides and optical components within the scope of the present disclosure and/or appended claims.

The spectral reflectance/transmittance characteristics of the coatings employed for spectral filters 412/432/434/452/454 typically vary with angle of incidence, and typically differ for S and P incident polarizations as the angle of incidence increases from 0° (i.e., normal incidence). The incoming optical signals typically arrive through optical fiber 490 in well-defined but unknown polarization states, and these polarization states may vary in unknown ways with time (the incoming signals perhaps traversing differing paths through an optical telecommunications system at differing times). The effect of this polarization variability of the performance of spectral filters 412/432/434/452/454 may be maintained at or below an operationally acceptable level by selecting a sufficiently small angle of incidence. "Sufficiently small" typically depends on the specific performance requirements for a specific device. For example, widely separated wavelengths $\lambda_1$, $\lambda_2$, and $\lambda_3$ may allow a wider range of angle of incidence than more closely spaced wavelengths. The geometric arrangement of the waveguides and spectral filters typically imposes a minimum angle of incidence. In the exemplary embodiment, spectral filters 432/434 (FIG. 10A) or 452/454 (FIG. 10B) may be arranged near normal incidence (thereby substantially reducing polarization-dependent performance), since it need only reject the reflected wavelength. Spectral filters 412/452 (FIG. 10A) or 412/432 (FIG. 10B) typically require off-normal incidence, since the reflected wavelength must be directed to another waveguide. The angles of incidence for these off-normal spectral filters are typically selected to be small enough to maintain polarization-dependent performance variations within operationally acceptable limits, and large enough to accommodate suitable geometry of the waveguides. An angle of incidence of about 10° is shown in the exemplary embodiment (about 20° between reflectively coupled waveguides); angles between reflectively coupled waveguides in these types of bidirectional assemblies may typically range between about 15° and about 35°. Specific upper and lower limits for the angle of incidence may typically vary depending on the detailed performance specifications of a specific device (in some instances falling outside the exemplary range given above), while remaining within the scope of the present disclosure and/or appended claims.

As shown in the exemplary embodiment of FIGS. 10A and 10B, spectral filters 432 and 434 are formed on a common component substrate. A pocket or interior volume is formed as described hereinabove partially enclosed between two side walls, two end walls, and the horizontal member. Each end wall may serve as a transmissive/reflective optical component as described herein, and the pocket may accommodate a waveguide segment therein. The enclosed waveguide segment may therefore be transmissively coupled at each end through the end walls to two other waveguides outside the pocket. Such a two-component substrate (components 100a and 100b on horizontal member 101) and the waveguide segment 310 enclosed therein may be adapted for normal or non-normal incidence, as needed or desired (FIGS. 11A/11B). If an embedding medium is to be employed between the ends of waveguide 310 and the inner surfaces of components 100a and 100b, one or more openings may be provided through one or both side walls, through one or both end walls around the optical component (s), and/or through horizontal member 101. Such openings permit the embedding medium to flow into interior volume 106 and fill spaces between the optical surfaces.

A variety of materials and fabrication techniques may be employed for forming optical component 100, interior volume 106, side walls 108, and other structures on horizontal member 101. Depending on the intended wavelength range for use of optical component 100, different materials may be employed. Suitable materials may include, but are not limited to, semiconductors (including but not limited to silicon, GaAs, InP, other III–V semiconductors, and/or semiconductor alloys and/or oxides), crystalline materials, silica or silica-based materials, other glasses, polymers, and myriad other examples not explicitly set forth herein but that may nevertheless fall within the scope of the present disclosure and/or appended claims. A single material may be employed for both horizontal member 101 and optical component 100, or one material may be employed for horizontal member 101 and another material overlayer thereon used for forming optical component 100.

Spatially-selective processing may be used on a wafer scale for concurrent fabrication of multiple optical components on a common wafer. The optical component 100 protrudes from the horizontal member, and surfaces 102 and/or 104 may be substantially perpendicular to the surface of a substantially planar wafer (FIGS. 12A/12B/12C; non-perpendicular surfaces may be acceptable or desirable in some instances). Horizontal member 101 and any horizontal support/alignment surfaces are defined by the planar substrate wafer, while substantially vertical alignment and/or optical surfaces are defined by spatially selective processing steps. The quality of surfaces 102/104 is determined by the nature of the spatially-selective steps used to form them. Varying degrees of surface quality may be attained depending on the specific techniques used and the precise manner in which they are carried out. Some exemplary processing techniques for forming surface 102/104 may include, without being limited to, dry etch processes (such as reactive ion etching), anisotropic wet etch processes (restricted to specific crystallographically defined surfaces), cleaving (along crystallographically defined cleavage planes; may only be applicable for surface 102 since the substrate wafer is cleaved along with component 100), and/or cutting with a precision saw or other mechanical cutting implement.

Figure 12A:
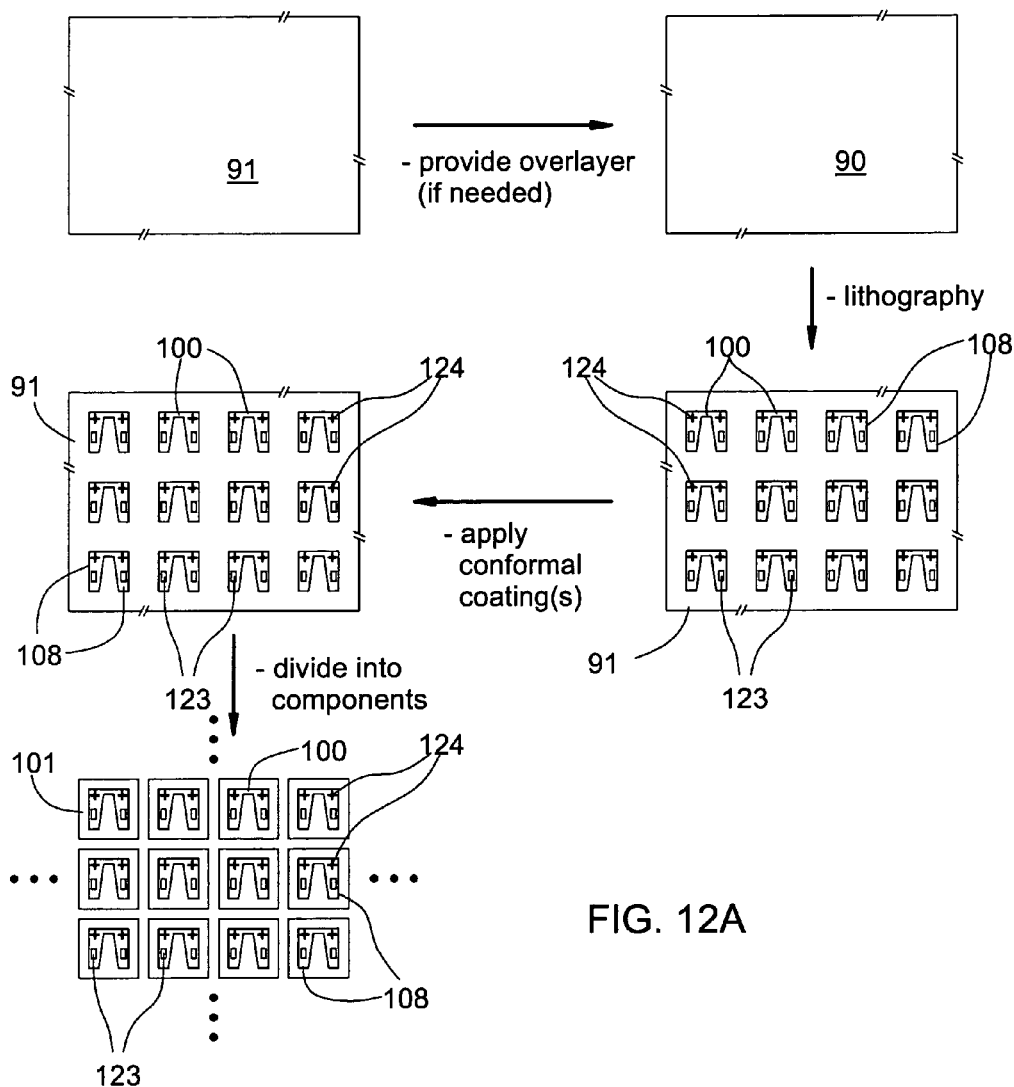
Figure 12B:
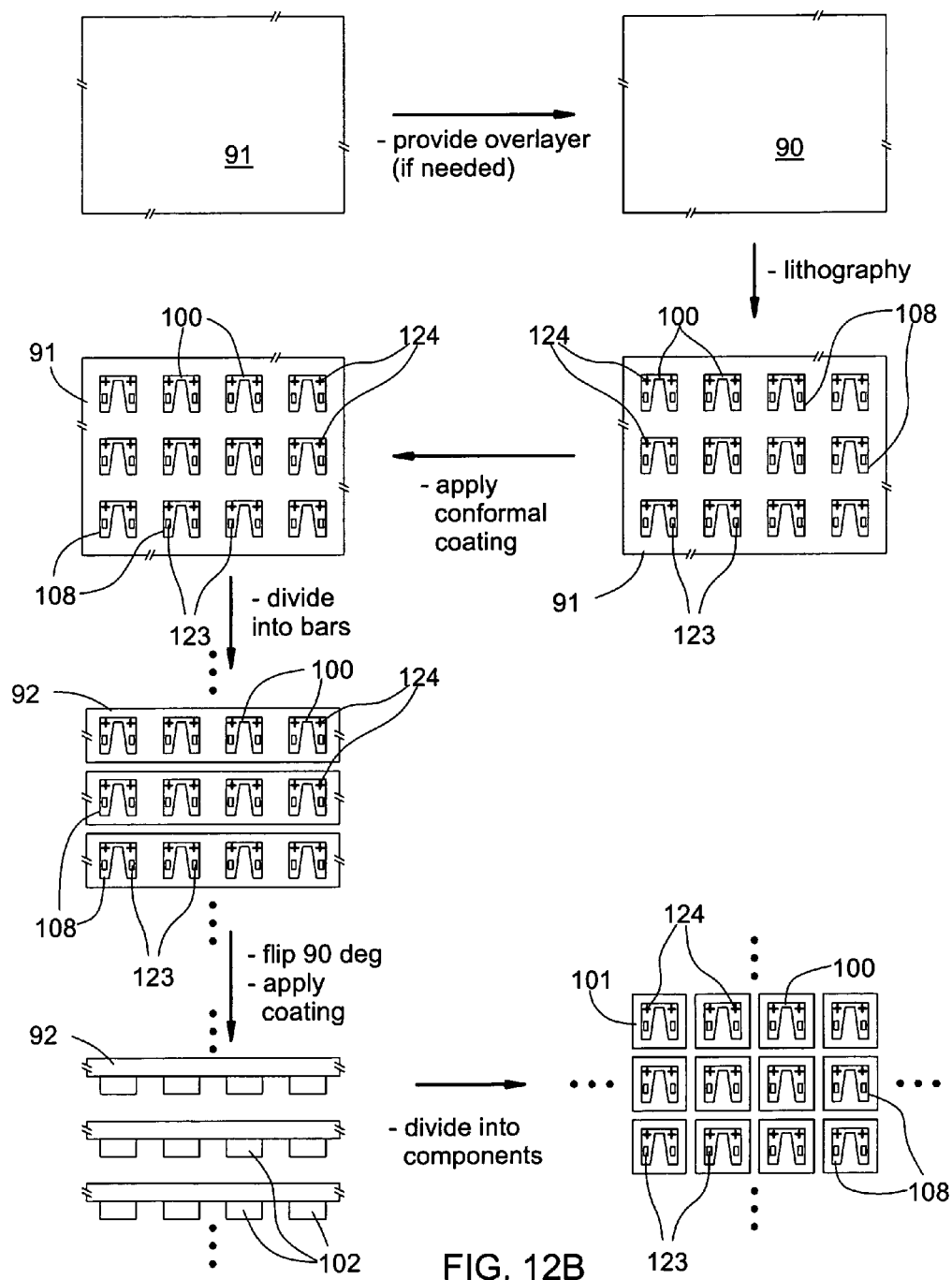
Figure 12C:
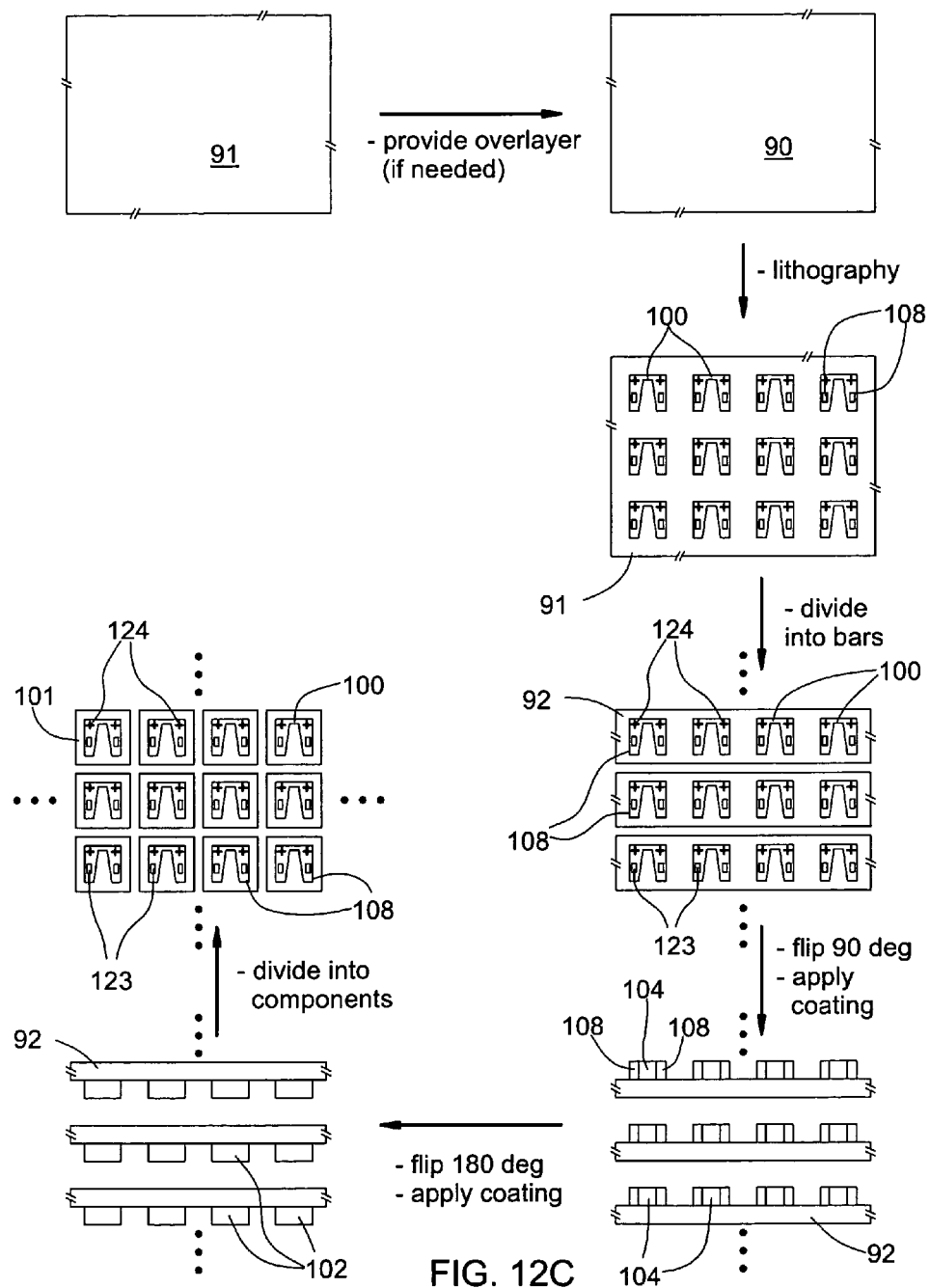

Optical coatings applied to these "vertical" surfaces 102 and/or 104 may be applied on a wafer scale in some instances (FIGS. 12A and 12B). So-called conformal deposition techniques may be used to coat both horizontal and vertical surfaces with layers of substantially uniform thickness, for example. In FIG. 12A, coatings are provided in this way for both surfaces 102 and 104 (same or differing coatings for the two surfaces), after which the wafer is divided into individual components. A wider array of coatings and coating techniques may be brought to bear on vertical surfaces 102/104 if a wafer-scale substrate is first cut into strips, or "bars", each having thereon a single row of multiple components (FIGS. 12B and 12C). In FIG. 12B, a conformal coating is applied on a wafer scale to surfaces 104 before division of the wafer into bars. After division into bars, the bars may be flipped about 90° so that surfaces 102 are "horizontal" with respect to a coating chamber or other material deposition apparatus. The bars may be divided into individual components after depositing a desired coating on surfaces 102 of the bars. In FIG. 12C, the wafer is divided into bars before any coatings are deposited. After division into bars, the bars may be flipped about 90° and a desired coating may be applied to one of surfaces 102 or 104. The bars may then be flipped about 180° and a desired coating (same coating or a different coating) may be applied to the other of surfaces 102 or 104. After application of the coating(s), the bars may be divided into individual components.

Exemplary embodiments shown in FIGS. 5A/5B/5C/5D and 6A/6B/6C/6D may have optical component 100, side walls 108, and horizontal member 101 formed from a single substantially homogeneous substrate material. Suitable substrate materials may include silicon, InP and/or other III–V semiconductors, other suitable semiconductors, semiconductor oxides and/or alloys, and/or other suitable materials. Alternatively, component 100 and side walls 108 may be formed from an overlayer 90 on a substrate 91 (as in FIGS. 12A/12B/12C), for example a silica or silica-based overlayer on a silicon substrate (other overlayer/substrate combinations may be employed). The overlayer 90 may comprise a single substantially homogeneous layer, resulting in a substantially homogeneous component 100, or may comprise a multiple layers of differing materials, resulting in a vertical discontinuity, gradient, or modulation of the optical properties of component 100. Exemplary process diagrams are shown in FIGS. 12A/12B/12C. Spatially-selective etching of layer 90 or substrate 91 (if no overlayer is present) may be employed for forming pocket 106, inner surfaces of sidewalls 108, and surface 104 of optical component 100. Additional alignment/support structures (if present; none shown in FIGS. 5A/5B/5C/5D and 6A/6B/6C/6D) and/or alignment marks 124 may be provided as well (concurrently or sequentially with pocket 106), in addition to other elements such as solder pads and the like, if desired. Surface 102 may also be formed by spatially-elective etching (concurrently or sequentially with forming pocket 106 and/or support structures and/or alignment marks 124), or surface 102 may be provided by a precision saw cut followed by a re-flow or annealing step or some other suitable smoothing step (a wet etch step, for example), or surface 102 may be formed by precision cleaving of the wafer (including both component 100 and horizontal member 101) into bars 92. The spatially-selective etch steps employed and/or the saw cut may be carried out in a manner to provide substantially flat, substantially vertical surfaces 102/104 (within operationally acceptable tolerances). Etching or cleaving restricted to semiconductor crystal planes produces surfaces oriented to the accuracy enabled by orientation of the substrate wafer.

Depending on the nature of the optical component to be formed, it may be desirable for surfaces 102/104 to be substantially parallel, or for a designed wedge angle to be provided between them, in either case within operationally acceptable tolerances. Such a wedge angle may be provided by the horizontal dimension by suitable spatial control of etch, cleave, and/or saw cut processing step(s). A wedge angle in the vertical dimension may be achieved by adaptation of etch, cleave, and/or saw cut processing step(s) to form the desired wedge angle. While etching has been set forth in the preceding fabrication example, it should be noted that other spatially-selective material removal techniques, spatially-selective material deposition techniques, or a combination of spatially-selective material deposition and removal techniques, may be also be employed for forming optical component 100. Any desired horizontal variation in the optical properties of component 100 (transverse or longitudinal) may be provided at this point by suitable spatially-selective processing of the end wall of interior volume 106.

Once surfaces 102 and 104 have been formed, thereby forming a "blank" for optical component 100, coatings may be applied to one or both of surfaces 102/104 as described hereinabove. These coatings may be of any suitable type for providing the desired functionality, and may be provided by any suitable method for providing such coatings. For example, optical component 100 may comprise a dichroic beamsplitter or 11 beam combiner (i.e., substantially reflective at one or more design wavelengths or wavelength bands, substantially transmissive at one or more other design wavelengths or wavelength bands; may also be referred to as a spectral filter). The spectral and polarization characteristics of transmission and reflection required may vary widely and may be determined by: the intended use of the component 100 and specifications therefor, design and manufacturing capabilities for providing the coating(s), separation of the design wavelengths or wavelength bands, angle of incidence and polarization characteristics of incident optical signals, and other relevant parameters, while remaining within the scope of the present disclosure and/or the appended claims. Such a filter coating may be applied to either of surfaces 102 and 104. If necessary or desirable, additional reflection from the other surface may be suppressed by providing a suitable anti-reflective coating thereon. Unwanted reflection may be redirected by providing a wedge angle between the surfaces 102 and 104, or may be laterally displaced by providing component 100 with sufficient thickness in an off-normal incidence geometry (for example, a component about 100 μm thick at about a 100 to 15° incidence angle sufficiently may typically suppress back-coupling of an unwanted reflection into the waveguide). If component 100 and the waveguide have similar indices (around 1.4–1.5 for silica-based waveguides and components, for example), embedding the component and the end faces of the waveguide with an index-matching medium may obviate the need for an anti-reflection coating, a wedge angle, and/or a thick off-setting component. If component 100 and the waveguides differ substantially in refractive index (1.4–1.5 for silica-based waveguides and 2.9–3.4 for semiconductor-based components, for example), then one or more of an anti-reflection coating, a wedge angle, and/or a thick component may be required to sufficiently suppress unwanted reflection from the component 100, whether or not an embedding medium is employed.

As noted hereinabove, coatings may be provided on surface(s) 102/104 during wafer-scale processing using conformal deposition techniques, or the wafer may be divided into bars with single rows of components and coated using a wider array of coating techniques. Some embodiments of an optical components shown herein include a pocket 106 with non-parallel side walls 108 (i.e., pocket 106 narrows from the open end toward the optical component). This has been described as enabling positioning of the optical component at a desired angle of incidence relative to a waveguide within pocket 106. The widening of the pocket may also facilitate application of an optical coating to the inner surface 104 of the optical component 100. It should also be noted that for dual-component substrates (as in FIGS. 11A/11B), any coating(s) applied to the inner surface of one or both components 100a/100b are most readily applied during wafer-scale processing. Dividing the wafer into bars in this instance does not provided improved access to the inner surface(s) of the component(s) for applying a coating.

The spatially-selective processing steps of FIGS. 12A/12B/12C for fabricating optical component 100 substantially perpendicular to a wafer may be implemented on a wafer scale for concurrent fabrication of many components on a common wafer (dozens, hundreds, or thousands of components per wafer). In this way significant economies of scale may be realized. As already pointed out, some manufacturing steps may not be suitable for implementation on a wafer scale, but may still be performed simultaneously for multiple devices without manipulation of individual components. For example, some process sequences for providing an optical coating on surface 102 or 104 (substantially orthogonal to the wafer surface) might be complex to perform on a wafer scale, particularly if the desired coating comprises multiple coating layers. The surfaces might be more readily coated, or more complex, precision multi-layer coatings more readily applied, if the surface to be coated is oriented so that it is substantially orthogonal to a deposition direction of a coating apparatus. Initial cleavage or division of the wafer (after completion of wafer-scale processing steps) in one dimension yields bars or strips of the wafer each with a single row of components thereon. The initial division may be done so that the surfaces to be coated are substantially parallel to the long axis of the bar. The optical coatings may then be applied to surfaces 102 and/or 104 as required, concurrently for multiple components on each bar, without handling individual components. It may be possible to coat multiple bars concurrently in a common coating apparatus. Once the coating(s) have been applied, the bars may be further divided to yield individual components.

A variety of techniques may be employed during process sequences (such as in FIGS. 12A/12B/12C) for providing more general optical functionalities for component 100, as described hereinabove. Multi-layer, gradient, or modulated materials of a wide variety of types (super-lattice materials, quantum well materials, doped materials, index gradient materials, and so on) may be used to provide vertical discontinuities, gradients, and/or modulations of optical characteristics of component 100. Such materials may be formed as a substantially uniform set of layers, with spatially-selective etching or other material spatially-selective removal of material employed to form optical component 100. A sequence of spatially-selective depositions of differing materials may be employed to form optical component 100. In either case, wafer-scale processing may be employed for concurrent fabrication of many components. Spatially-selective material processing may be employed for providing horizontal discontinuities, gradients, and/or modulations of optical properties of component 100, and may be implemented on a wafer scale for many components concurrently. Spatial discontinuities, gradients, and/or modulations of coatings applied to surfaces 102 and/or 104 (including surface gratings) may be provided using any suitable spatially selective coating and/or processing techniques, which may be implemented for multiple components concurrently on a common bar. Control of the horizontal orientation of surfaces 102/104 by spatial control of processing steps was described hereinabove. In a similar manner, spatial control of processing steps may be employed for providing a curvilinear and/or faceted horizontal profile for one or both of surfaces 102/104. Such surface profiles may be provided in the vertical dimension as well by suitable modification of spatially selective processing. For example, multi-step and/or gray-scale lithography might be employed for providing such vertical surface profiles. Any one or more of these and any other suitable processing steps and/or adaptations thereof may be employed for providing optical component 100 with intended optical functionality while remaining within the scope of the present disclosure and/or appended claims.

Wafer-scale spatially-selective processing may be used for concurrent fabrication of multiple optical components on a common wafer, in which each optical component 100 and surfaces 102/104 thereof are substantially parallel to a substantially planar wafer surface (FIGS. 13A/13B; the "vertical" optical component end wall now lies parallel to the substrate wafer). Such an arrangement during spatially-selective processing may result in improved optical quality of these surfaces, and may enable wafer-scale application of optical coatings on surface 102 and/or 104 of any desired precision and/or complexity. In exemplary process sequences (FIGS. 13A/13B), a substantially planar silicon wafer 500 is first provided with a substantially uniform overlayer 502 that will eventually form the end wall of interior volume 106 (and optical component 100). Overlayer 502 may comprise silica, silicon nitride, or silicon oxynitride on silicon wafer 500, for example. InP or other suitable III–V semiconductor or alloy may be equivalently employed as substrate 500, with InP or other III–V or alloy or oxide thereof may be employed as overlayer 502. Other substantially homogeneous overlayers may be employed on any suitable wafer material while remaining within the scope of the present disclosure and/or appended claims. Overlayer 502 may instead comprise a multi-layer material for providing optical functionality (with material variation along the eventual optical propagation direction within component 100). The overlayer may be patterned and etched, leaving optical component layers 504 that will each eventually serve as the end wall of a pocket 106, surrounded by exposed regions of wafer 500. If transverse variation in the optical properties of optical component 100 is desired, suitable spatially-selective processing of areas 504 may be employed to provide the same. If surface 102 is to be curved, the curved surface may be provided at this point using gray-scale lithography or other similar techniques to alter the surface profiles of areas 504 (in one or both dimensions).

Wafer 500 may then be processed to form passages 506 therethrough adjacent to component layers 504. Wafer 500 is then flipped over and processed from the other side to remove substrate material from behind a central portions of component layers 504. A material-specific etch is employed to completely remove wafer material from the central portion of the back side of area 504 (which becomes surface 104 of optical component 100), while leaving a suitably high-optical-quality surface on the back side of component layers 504. An annealing or smoothing process may be employed if needed or desired. If a curved surface 104 is desired, it may be provided at this point using gray-scale lithography or other similar techniques to alter the back-side surface profiles of component layers 504 (in one or both dimensions). The generally vertical substrate side walls formed during this step form the inner surfaces of horizontal member 101 and side walls 108 in the finished optical component. Depending on the etch process used and the designed geometry, the substrate side walls may be substantially vertical (yielding substantially parallel side walls 108) or may be angled (yielding an interior volume 106 with a wide open end and narrowing toward optical component 100, as shown hereinabove). Any desired optical coating may be applied on a wafer scale to the back surface of the wafer 500, thereby providing an optical coating for surfaces 104 of many optical components.

Figure 13B:
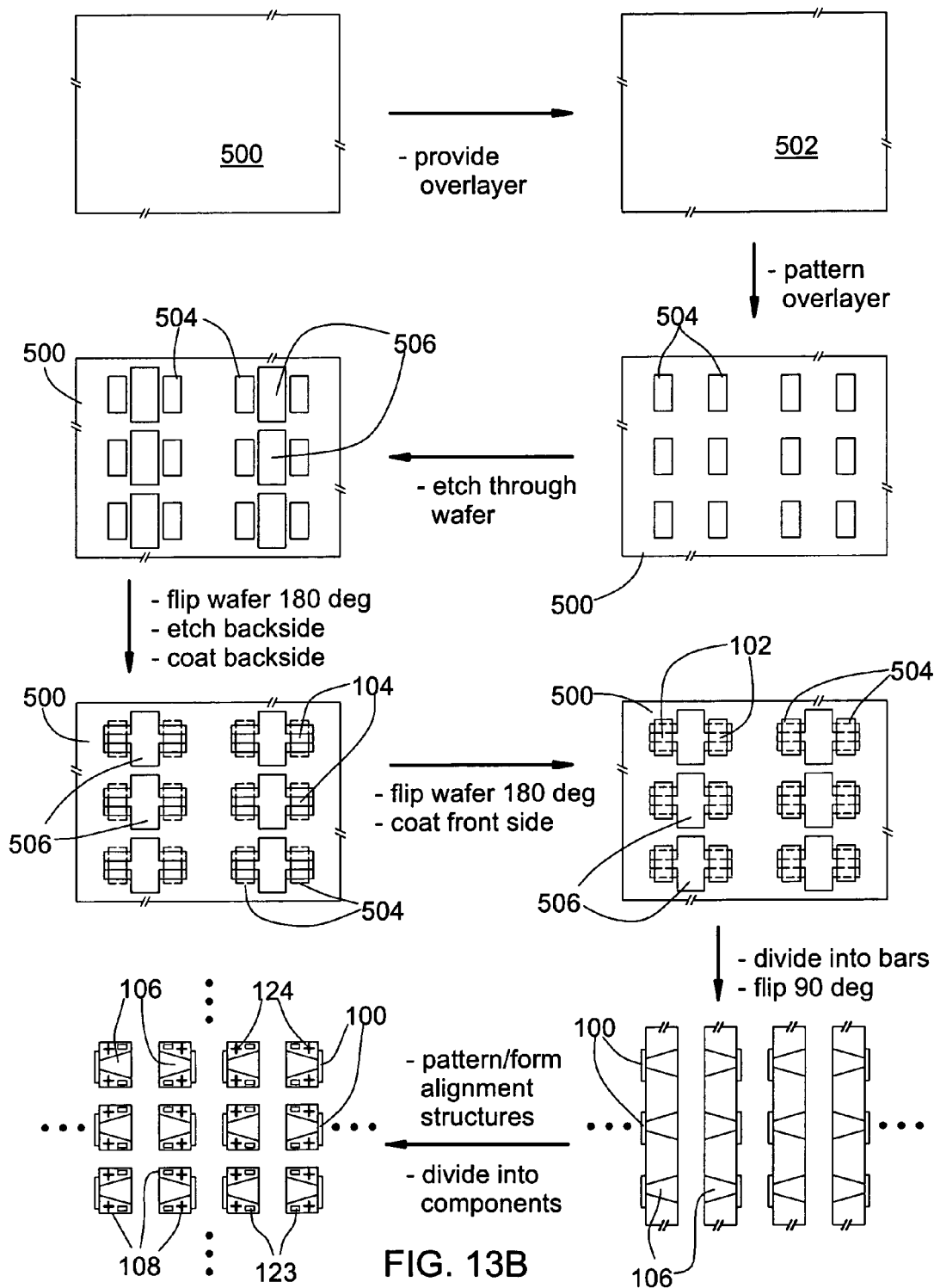

Wafer 500 may be flipped once more, and any desired optical coating applied on a wafer scale to the front surface of the wafer, including component layers 504 (eventually surfaces 102 of optical components 100). The component layer areas 504 of the overlayer thus forms the "blank" for optical component 100, and the coatings applied on a wafer scale to the front and back surfaces of the wafer serve as the optical coatings for surfaces 102 and/or 104. Once the wafer-scale processing is complete, the wafer may be cut into individual optical components (FIG. 13A). Precision saw cuts may be employed, for example, to divide wafer 500 into individual optical components, or other precision cutting or cleaving procedure(s) may be employed. The surfaces produced by dividing the wafer form the outer and bottom surfaces (upon flip-chip mounting) of side walls 108 in the finished optical components (FIGS. 14A/14B). The precision position and orientations of these surfaces is determined by the precision of the wafer-dividing procedures used. The outer and/or bottom surfaces of the side walls 108 may serve to accurately position optical component 100 on substrate 200 upon assembly with waveguide 210/230/250 (as in FIGS. 7A/7B and 8A/8B). It should be pointed out that the resulting horizontal member 101 that results from this processing sequence is substantially perpendicular to the wafer before separation into individual components. In order to provide alignment and/or assembly structures on the bottom surface of side walls 108 (such as solder pads 123, alignment markings 124, alignment edges, and so forth), the wafer may be divided into bars, the bars flipped about 90°, and the desired structures formed on the bottom surface of the side walls (FIG. 13B). Once processing of the bottom of the side walls is complete, the bars may be divided into individual components.

In the foregoing exemplary embodiments of an optical assembly, as well as other similarly implemented embodiments, spatially-selective material processing techniques may be employed for achieving sufficiently accurate relative positioning (within operationally acceptable limits) of elements provided on substrate 200, such as any of waveguides 210/230/250 that are implemented as planar waveguides on substrate 200, V-groove(s) 201, alignment edge(s) 202, alignment/support structure(s) 203/205/223, and/or alignment mark(s) 204/224. Similarly, spatially-selective material processing techniques may be employed for achieving sufficiently accurate relative positioning (within operationally acceptable limits) of elements provided on a separate substrate 239, such as waveguide 230, alignment/support structures 233, and/or alignment marks 234. These spatially-selective processing steps for fabricating substrate 200 (and structures thereon) may be implemented on a wafer scale for concurrent fabrication of many substrates on a common wafer (dozens, hundreds, or thousands of substrates per wafer). In this way significant economies of scale may be realized. After division of the wafer into individual substrates 200, any required optical component(s) 100, separate waveguide(s), photodetector(s), optical fiber(s), and so forth may be positioned and secured thereon to provide a functional optical assembly. Various grooves, alignment edges, alignment/support structures, alignment markings, and so forth readily enable sufficiently accurate passive assembly (within operationally acceptable tolerances) for implementing intended optical functionalitie(s) of the optical assembly.

For purposes of the foregoing written description and/or the appended claims, the term "optical waveguide" (or equivalently, "waveguide") as employed herein shall denote a structure adapted for supporting one or more optical modes. Such waveguides shall typically provide confinement of a supported optical mode in two transverse dimensions while allowing propagation along a longitudinal dimension. The transverse and longitudinal dimensions/directions shall be defined locally for a curved waveguide; the absolute orientations of the transverse and longitudinal dimensions may therefore vary along the length of a curvi-linear waveguide, for example. Examples of optical waveguides may include, without being limited to, various types of optical fiber and various types of planar waveguides. The term "planar optical waveguide" (or equivalently, "planar waveguide") as employed herein shall denote any optical waveguide that is formed on a substantially planar substrate. The longitudinal dimension (i.e., the propagation dimension) shall be considered substantially parallel to the substrate. A transverse dimension substantially parallel to the substrate may be referred to as a lateral or horizontal dimension, while a transverse dimension substantially perpendicular to the substrate may be referred to as a vertical dimension. Examples of such waveguides include ridge waveguides, buried waveguides, semiconductor waveguides, other high-index waveguides ("high-index" being above about 2.5), silica-based waveguides, polymer waveguides, other low-index waveguides ("low-index" being below about 2.5), core/clad type waveguides, multi-layer reflector (MLR) waveguides, metal-clad waveguides, air-guided waveguides, vacuum-guided waveguides, photonic crystal-based or photonic bandgap-based waveguides, waveguides incorporating electro-optic (EO) and/or electro-absorptive (EA) materials, waveguides incorporating nonlinear-optical (NLO) materials, and myriad other examples not explicitly set forth herein which may nevertheless fall within the scope of the present disclosure and/or appended claims. Many suitable substrate materials may be employed, including semiconductor, crystalline, silica or silica-based, other glasses, ceramic, metal, and myriad other examples not explicitly set forth herein which may nevertheless fall within the scope of the present disclosure and/or appended claims.

One exemplary type of planar optical waveguide that may be suitable for use with optical components disclosed herein is a so-called PLC waveguide (Planar Lightwave Circuit). Such waveguides typically comprise silica or silica-based waveguides (often ridge or buried waveguides; other waveguide configuration may also be employed) supported on a substantially planar silicon substrate (often with an interposed silica or silica-based optical buffer layer). Sets of one or more such waveguides may be referred to as planar waveguide circuits, optical integrated circuits, or opto-electronic integrated circuits. A PLC substrate with one or more PLC waveguides may be readily adapted for mounting one or more optical sources, lasers, modulators, and/or other optical devices adapted for end-transfer of optical power with a suitably adapted PLC waveguide. A PLC substrate with one or more PLC waveguides may be readily adapted (according to the teachings of U.S. Patent Application Pub. No. 2003/0081902 and/or U.S. App. No. 60/466,799) for mounting one or more optical sources, lasers, modulators, photodetectors, and/or other optical devices adapted for transverse-transfer of optical power with a suitably adapted PLC waveguide (mode-interference-coupled, or substantially adiabatic, transverse-transfer; also referred to as transverse-coupling). Reflective and/or transmissive optical components as disclosed herein may be readily employed with one or more suitably adapted PLC waveguides.

For purposes of the foregoing written description and/or appended claims, "spatially-selective material processing techniques" shall encompass epitaxy, layer growth, lithography, photolithography, evaporative deposition, sputtering, vapor deposition, chemical vapor deposition, beam deposition, beam-assisted deposition, ion beam deposition, ion-beam-assisted deposition, plasma-assisted deposition, wet etching, dry etching, ion etching (including reactive ion etching), ion milling, laser machining, spin deposition, spray-on deposition, electrochemical plating or deposition, electroless plating, photo-resists, UV curing and/or densification, micro-machining using precision saws and/or other mechanical cutting/shaping tools, selective metallization and/or solder deposition, chemical-mechanical polishing for planarizing, any other suitable spatially-selective material processing techniques, combinations thereof, and/or functional equivalents thereof. In particular, it should be noted that any step involving "spatially-selectively providing" a layer or structure may involve either or both of: spatially-selective deposition and/or growth, or substantially uniform deposition and/or growth (over a given area) followed by spatially-selective removal. Any spatially-selective deposition, removal, or other process may be a so-called direct-write process, or may be a masked process. It should be noted that any "layer" referred to herein may comprise a substantially homogeneous material layer, or may comprise an inhomogeneous set of one or more material sub-layers. Spatially-selective material processing techniques may be implemented on a wafer scale for simultaneous fabrication/processing of multiple structures on a common substrate wafer.

It should be noted that various components, elements, structures, and/or layers described herein as "secured to", "connected to", "mounted on", "deposited on", "formed on", "positioned on", etc., a substrate may make direct contact with the substrate material, or may make contact with one or more layer(s) and/or other intermediate structure(s) already present on the substrate, and may therefore be indirectly "secured to", etc, the substrate.

The phrase "operationally acceptable" appears herein describing levels of various performance parameters of optical components and/or optical devices, such as optical power transfer efficiency (equivalently, optical coupling efficiency), optical loss, undesirable reflection, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular optical component or assembly. Such "operationally acceptable" levels of such parameters may therefor vary within a given class of devices depending on such constraints and/or requirements. For example, a lower optical coupling efficiency may be an acceptable trade-off for achieving lower device fabrication costs in some instances, while higher optical coupling may be required in other instances in spite of higher fabrication costs. The "operationally acceptable" coupling efficiency therefore varies between the instances. Many other examples of such trade-offs may be imagined. Optical components, planar waveguides, and fabrication and/or assembly methods therefor as disclosed herein, and equivalents thereof, may therefore be implemented within tolerances of varying precision depending on such "operationally acceptable" constraints and/or requirements. Phrases such as "substantially spatial-mode-matched", "substantially index-matched", "so as to substantially avoid undesirable reflection", and so on as used herein shall be construed in light of this notion of "operationally acceptable" performance.

While particular examples have been disclosed herein employing specific materials and/or material combinations and having particular dimensions and configurations, it should be understood that many materials and/or material combinations may be employed in any of a variety of dimensions and/or configurations while remaining within the scope of inventive concepts disclosed and/or claimed herein. It should be pointed out that while wafer-scale processing sequences are set forth as examples, any or all of the processing sequences set forth herein, and/or equivalents thereof, may also be implemented for smaller sets of components, or for individual components, while remaining within the scope of the present disclosure and/or appended claims. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure and/or appended claims.

What is claimed is:

1. A method, comprising:
    integrally forming on a horizontal member two side walls and a substantially transparent end wall, the end wall and the side walls protruding from the horizontal member, the end wall, side walls, and horizontal member partially enclosing an interior volume; and
    imparting optical functionality on at least a portion of the end wall, wherein the two side walls are arranged for engaging a substantially horizontal mounting surface so as to position the end wall at a desired angle with respect to the mounting surface and so that the mounting surface partially encloses the interior volume opposite the horizontal member.

2. The method of claim 1, wherein the optical functionality is imparted by:
i) forming at least one optical coating on at least one surface of the end wall;
ii) providing the end wall with at least one curved surface;
iii) providing at least one surface of the end wall with a spatially-varying surface profile;
iv) providing the end wall with at least one spatially-varying optical property;
v) providing the end wall with at least one anisotropic optical property; or
vi) providing the end wall with at least one spectrally-varying optical property.

3. The method of claim 1, further comprising:
forming multiple horizontal members and corresponding side walls and substantially transparent end walls on a common substrate wafer;
imparting optical functionality on at least portions of the multiple end walls on the common substrate wafer; and
dividing the substrate wafer so as to separate the multiple horizontal members from one another.

4. The method of claim 3, wherein at least a portion of the optical functionality is imparted prior to dividing the substrate wafer.

5. The method of claim 3, wherein at least a portion of the optical functionality is imparted after dividing the substrate wafer into bars, each bar comprising a single row of multiple horizontal members, and prior to dividing the bars into separate horizontal members.

6. The method of claim 3, wherein at least a portion of the optical functionality is imparted after dividing the substrate wafer into separate horizontal members.

7. The method of claim 1, further comprising forming at least one alignment surface on the horizontal member or on at least one of the side walls.

8. The method of claim 1, further comprising forming at least one alignment mark on the horizontal member or on at least one of the side walls.

9. The method of claim 1, further comprising forming at least one optical coating on at least one surface of the end wall.

10. The method of claim 9, wherein the optical coating comprises a spectrally-selective filter coating.

11. The method of claim 1, further comprising providing the end wall with at least one curved surface.

12. The method of claim 1, further comprising providing the end wall with at least one spectrally-varying optical property.

13. The method of claim 1, further comprising:
forming a second end wall protruding from the horizontal member and partially enclosing the interior volume opposite the first end wall; and
imparting optical functionality on at least a portion of the second end wall.

14. The method of claim 1, wherein the horizontal member, the end wall, and the side walls are formed from a semiconductor material.

15. The method of claim 1, wherein the horizontal member is formed from a semiconductor material, and the end wall and side walls are formed from a low-index oxide material.

16. The method of claim 1, wherein the end wall is between about 20 μm and about 30 μm thick.

17. An optical apparatus, comprising:
a horizontal member;
two side walls integrally formed with and protruding from the horizontal member;
a substantially transparent end wall integrally formed with and protruding from the horizontal member, the end wall, side walls, and horizontal member partially enclosing an interior volume; and
optical functionality imparted on at least a portion of the end wall,
wherein the two side walls are arranged for engaging a substantially horizontal mounting surface so as to position the end wall at a desired angle with respect to the mounting surface and so that the mounting surface partially encloses the interior volume opposite the horizontal member.

18. The apparatus of claim 17, wherein the optical functionality is imparted by:
i) at least one optical coating formed on at least one surface of the end wall;
ii) at least one curved surface of the end wall;
iii) at least one surface of the optical component layer with a spatially-varying surface profile;
iv) at least one spatially-varying optical property of the end wall;
v) at least one anisotropic optical property of the end wall; or
vi) at least one spectrally-varying optical property of the end wall.

19. The apparatus of claim 17, further comprising at least one alignment surface formed on the horizontal member or on at least one of the side walls.

20. The apparatus of claim 17, further comprising at least one alignment mark formed on the horizontal member or on at least one of the side walls.

21. The apparatus of claim 17, further comprising at least one optical coating formed on at least one surface of the end wall.

22. The apparatus of claim 21, wherein the optical coating comprises a spectrally-selective filter coating.

23. The apparatus of claim 17, wherein the end wall has at least one curved surface.

24. The apparatus of claim 17, wherein the end wall has at least one spectrally-varying optical property.

25. The apparatus of claim 17, further comprising:
a second substantially transparent end wall protruding from the horizontal member and partially enclosing the interior volume opposite the first end wall; and
optical functionality imparted on at least a portion of the second end wall.

26. The apparatus of claim 17, wherein the horizontal member, the end wall, and the side walls are formed from a semiconductor material.

27. The apparatus of claim 17, wherein the horizontal member is formed from a semiconductor material, and the end wall and side walls are formed from a low-index oxide material.

28. The apparatus of claim 17, wherein the horizontal member and side walls are formed from a semiconductor material, and the end wall is formed from a low-index oxide material.

29. The apparatus of claim 17, wherein the end wall is between about 20 μm and about 30 μm thick.

30. The apparatus of claim 17, wherein at least one side wall absorbs light at an optical component operating wavelength.

31. An optical apparatus, comprising:
a planar optical waveguide formed on a waveguide substrate;
a second optical waveguide positioned on the waveguide substrate and optically end-coupled with the planar optical waveguide; and
an optical component, comprising
a horizontal member,
two side walls integrally formed with and protruding from the horizontal member;
a substantially transparent end wall integrally formed with and protruding from the horizontal member, the end wall, side walls, and horizontal member partially enclosing an interior volume; and
optical functionality imparted on at least a portion of the end wall, wherein:
the two side walls are arranged for engaging the waveguide substrate so as to position the end wall at a desired angle with respect to the waveguide substrate and so that the waveguide substrate partially encloses the interior volume opposite the horizontal member;
the optical component is mounted on the waveguide substrate with the two side walls engaged therewith; and
the planar optical waveguide and the second optical waveguide are optically end-coupled by reflection from the optical component end wall or by transmission through the optical component end wall.

32. The apparatus of claim 31, wherein the optical functionality is imparted by:
i) at least one optical coating formed on at least one surface of the optical component end wall;
ii) at least one curved surface of the optical component end wall;
iii) at least one surface of the optical component layer with a spatially-varying surface profile;
iv) at least one spatially-varying optical property of the optical component end wall;
v) at least one anisotropic optical property of the optical component end wall; or
vi) at least one spectrally-varying optical property of the optical component end wall.

33. The apparatus of claim 31, further comprising:
at least one optical component alignment surface formed on the horizontal member or on at least one of the side walls; and
at least one waveguide alignment surface formed on the planar waveguide or the waveguide substrate,
wherein the optical component is mounted on the waveguide substrate with the optical component alignment surface engaged with the waveguide alignment surface.

34. The apparatus of claim 31, further comprising:
at least one optical component alignment mark formed on the horizontal member or on at least one of the side walls; and
at least one waveguide alignment mark formed on the planar waveguide or the waveguide substrate,
wherein the optical component is mounted on the waveguide substrate with the optical component alignment mark aligned with the waveguide alignment mark.

35. The apparatus of claim 31, further comprising at least one optical coating formed on at least one surface of the optical component end wall.

36. The apparatus of claim 35, wherein the optical coating comprises a spectrally-selective filter coating.

37. The apparatus of claim 31, further comprising a third optical waveguide positioned on the waveguide substrate and optically end-coupled with the planar optical waveguide, wherein:
the planar optical waveguide and the second optical waveguide are optically end-coupled by reflection from the optical component end wall; and
the planar optical waveguide and the third optical waveguide are optically end-coupled by transmission through the optical component end wall.

38. The apparatus of claim 37, further comprising a fourth optical waveguide positioned on the waveguide substrate, wherein:
the third optical waveguide and the fourth optical waveguide are optically end-coupled by reflection from the optical component end wall; and
the second optical waveguide and the fourth optical waveguide are optically end-coupled by transmission through the optical component end wall.

39. The apparatus of claim 31, wherein the second optical waveguide comprises an optical fiber mounted on the waveguide substrate and optically end-coupled to with the planar waveguide by transmission through the optical component end wall.

40. The apparatus of claim 31, wherein the second optical waveguide comprises a second planar optical waveguide formed on the waveguide substrate and optically end-coupled to the planar waveguide by reflection from the optical component end wall.

41. The apparatus of claim 40, wherein cores of the first and second planar waveguides are less than about 1 µm in height.

42. The apparatus of claim 40, wherein the first and second planar waveguides form an angle between about 15° and about 35°.

43. The apparatus of claim 31, wherein the second optical waveguide comprises a second planar optical waveguide formed on a second waveguide substrate and optically end-coupled to the planar waveguide by mounting of the second planar waveguide on the first waveguide substrate.

44. The apparatus of claim 31, wherein an end of the planar waveguide is received within the interior volume of the optical component.

45. The apparatus of claim 31, further comprising a substantially transparent embedding medium substantially filling an optical path between the planar waveguide and the optical component end wall.

46. The apparatus of claim 31, wherein:
the optical component further comprises a second substantially transparent end wall protruding from the horizontal member and partially enclosing the interior volume opposite the first end wall, and optical functionality imparted on at least a portion of the second end wall;
the optical component is mounted on the waveguide substrate with a segment of the planar waveguide received within the interior volume and substantially enclosed by the optical component.

47. The apparatus of claim 31, wherein the optical component end wall is between about 20 µm and about 30 µm thick.

48. The apparatus of claim 31, wherein an end face of the planar optical waveguide is within about 5 μm of a facing surface of the end wall, and an end face of the second optical waveguide is within about 5 μm of a facing surface of the end wall.

49. The apparatus of claim 31, wherein at least one side wall is tilted and reflectively coated so that light emerging from at least one of the waveguides and incident on the tilted side wall is redirected toward the waveguide substrate.

50. An optical apparatus, comprising:
a substrate;
at least three planar optical waveguides formed on the substrate;
at least one laser mounted on the substrate for emitting optical power at an output wavelength;
at least one photodetector mounted on the substrate for detecting optical power at an input wavelength; and
at least one optical component mounted on the substrate, wherein:
a first one of the planar waveguides is optically end-coupled at a first end face thereof with a second one of the planar waveguides at an end face thereof;
the first planar waveguide is optically end-coupled at the first end face thereof with a third one of the planar waveguides at an end face thereof;
the optical component directs optical power emerging from the end face of the second planar waveguide into the first end face of the first planar waveguide;
the optical component directs optical power emerging from the first end face of the first planar waveguide into the end face of the third planar waveguide;
the laser is optically coupled to the second planar waveguide so that optical output power emitted by the laser propagates along the second planar waveguide and emerges through the end face thereof;
the photodetector is optically coupled to the third planar waveguide so that optical input power entering the end face thereof propagates along the third planar waveguide for detection by the photodetector;
the optical component comprises a horizontal member with two side walls and a substantially transparent end wall integrally formed therewith and each protruding therefrom and partially enclosing an interior volume, and a spectrally-selective optical filter coating formed on at least one surface of the end wall, the two side walls being arranged for engaging the substrate so as to position the end wall at a desired angle with respect to the substrate and so that the substrate partially encloses the interior volume opposite the horizontal member; and
the optical component is mounted with the two side walls engaged with the substrate, with the end wall near the waveguide end faces, and with at least one of the waveguide end faces received within the interior volume.

51. The apparatus of claim 50, wherein:
the optical filter coating reflects the output wavelength and transmits the input wavelength;
input optical power emerging from the first end face of the first planar waveguide is transmitted through the optical component end wall, enters the end face of the third planar waveguide, and is detected by the photodetector; and
output optical power emerging from the end face of the second planar waveguide is reflected from the optical component end wall, enters the first end face of the first planar waveguide, and propagates along the first planar waveguide.

52. The apparatus of claim 50, wherein:
the optical filter coating transmits the output wavelength and reflects the input wavelength;
input optical power emerging from the first end face of the first planar waveguide is reflected from the optical component end wall, enters the end face of the third planar waveguide, and is detected by the photodetector; and
output optical power emerging from the end face of the second planar waveguide is transmitted by the optical component end wall, enters the first end face of the first planar waveguide, and propagates along the first planar waveguide.

53. The apparatus of claim 50, further comprising an optical fiber optically end-coupled to the first planar waveguide at a second end face thereof, wherein the optical fiber is mounted on the substrate in a fiber alignment groove formed thereon.

* * * * *

UNITED STATES PATENT AND TRADEMARK OFFICE
CERTIFICATE OF CORRECTION

PATENT NO. : 7,031,575 B2  Page 1 of 1
APPLICATION NO. : 10/682768
DATED : April 18, 2006
INVENTOR(S) : Blauvelt et al.

It is certified that error appears in the above-identified patent and that said Letters Patent is hereby corrected as shown below:

In the Claims

Column 24, line 27, Claim 39   Delete "with"

Column 24, line 59, Claim 46   After "wall;",
Insert --and--

Signed and Sealed this

Twenty-seventh Day of November, 2007

JON W. DUDAS
*Director of the United States Patent and Trademark Office*